United States Patent [19]

Suzuki et al.

[11] Patent Number: 5,095,750

[45] Date of Patent: Mar. 17, 1992

[54] ACCELEROMETER WITH PULSE WIDTH MODULATION

[75] Inventors: Seikou Suzuki, Hitachioota; Shigeki Tsuchitani, Mito; Satoshi Shimada, Hitachi; Masayuki Miki, Katsuta; Shigeyuki Kobori; Masahiro Matsumoto, both of Hitachi, all of Japan

[73] Assignee: Hitachi, Ltd., Tokyo, Japan

[21] Appl. No.: 542,823

[22] Filed: Jun. 25, 1990

Related U.S. Application Data

[63] Continuation-in-part of Ser. No. 330,764, Mar. 30, 1989, abandoned.

[30] Foreign Application Priority Data

Apr. 1, 1988 [JP] Japan .................. 63-78034

[51] Int. Cl.⁵ .............................. G01P 15/13
[52] U.S. Cl. .................................. 73/517 B
[58] Field of Search .......... 73/517 B, 862.61

[56] References Cited

U.S. PATENT DOCUMENTS

| | | | |
|---|---|---|---|
| 3,911,738 | 10/1975 | Fischer | 73/517 B |
| 4,315,434 | 2/1982 | Eastman | 73/517 B |
| 4,345,474 | 8/1982 | Deval | 73/517 B |
| 4,598,586 | 7/1986 | Danielson | 73/517 B |
| 4,987,779 | 1/1991 | McBrien | 73/517 B |

*Primary Examiner*—John E. Chapman
*Attorney, Agent, or Firm*—Antonelli, Terry, Stout & Kraus

[57] ABSTRACT

An accelerometer having a movable electrode which is moved according to acceleration with respect to a fixed electrode disposed in opposition to the movable electrode. An output device generates an output voltage which is proportional to the acceleration by measuring a gap between the movable electrode and the fixed electrode. A pulse width modulator generates pulses, wherein a pulse width of the pulses is modulated according to the output voltage, and a feedback device feeds back an electrostatic force which is proportional to the pulse width of the pulses from the pulse modulator between the movable electrode and the fixed electrode. As the acceleration in the acceleration sensor is linearly detected, the acceleration sensor is easily adjusted.

18 Claims, 16 Drawing Sheets

OUTPUT OF PULSE WIDTH MODULATOR

OUTPUT OF INVERTER

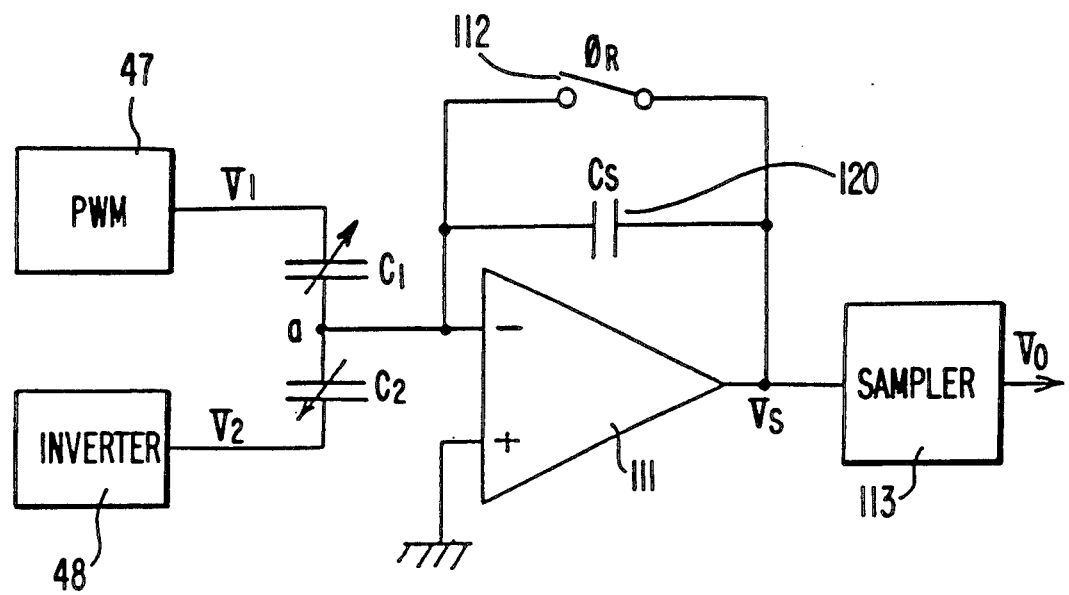
FIG. 21
FIG. 22(A) $\phi_R$
FIG. 22(B) $V_1$
FIG. 22(C) $V_2$
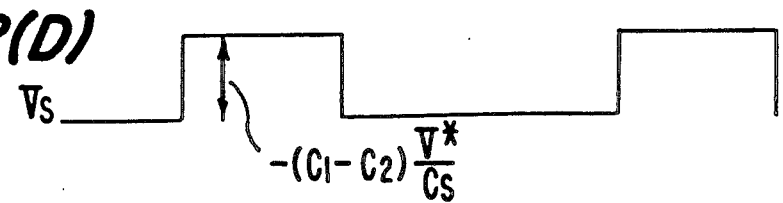
FIG. 22(D) $V_S$
$-(C_1-C_2)\dfrac{V^*}{C_S}$

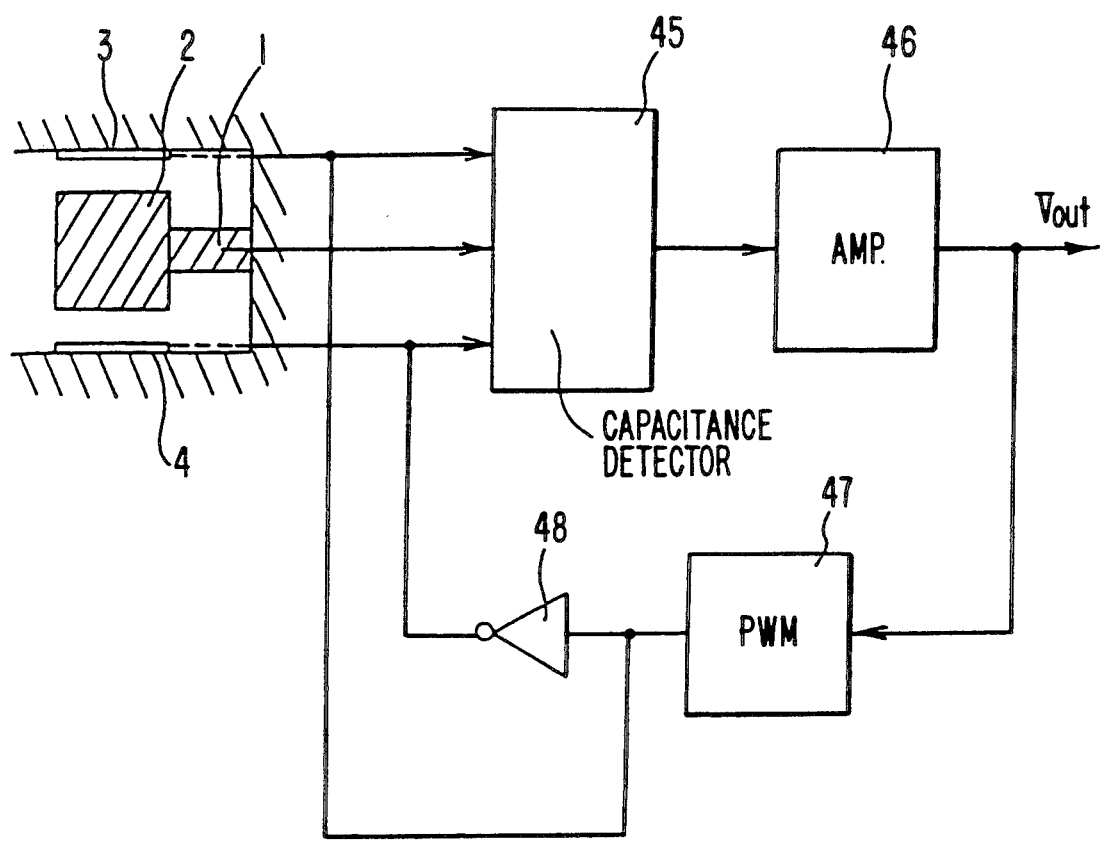

ACCELEROMETER WITH PULSE WIDTH MODULATION

CROSS-REFERENCE TO RELATED APPLICATION

This application is a continuation-in-part of our prior co-pending U.S. application Ser. No. 330,764, filed Mar. 30, 1989, now abandoned.

BACKGROUND OF THE INVENTION

This invention relates to detection of acceleration, such as by an accelerometer, and particularly to an accelerometer which is suitable for use a car body control system for a motor vehicle. In such a an accelerometer capable of accurately detecting acceleration in the range of $0 \sim \pm 1(G)$ and $0 \sim 10(Hz)$ is required, . being equal to 9.8(m/s$^2$).

A large number of have been developed for use as an accelerometer in which a is displaced in response to acceleration and the displacement is detected by a detecting system. Known detecting systems include a piezoelectric system using the piezoelectric effect of a piezoelectric material, a strain gauge system using piezoresistance effect, a servo system having a force feedback system, a magnetic system utilizing a differential transformer, an optical system utilizing a photo-interrupter, a capacitance system utilizing a detector produced by a technique miniaturization etching of silicon, and so forth.

Among these systems, it has been proposed to drive the capacitance type sensor of an electrostatic servo system. The publication TRANSDUCERS '87, The 4th International Conference on Solid-State and Actuators, Pages 395 to 398, and U.S. Pat. No. 4,483,194 are cited as showing examples of such a device.

The system which drives the capacitance type sensor utilizing the conventional miniaturization etching of silicon by means by an electrostatic servo system involves the drawbacks that a compensation circuit for linearizing non-linearity in the system is needed because non-linearity of the electrostatic servo mechanism is great, the output characteristics can not be adjusted easily and the production yield of the sensor is low.

The typical structure of a capacitance type accelerometer includes the electrodes 2 to 4 and cantilever 1 as generally shown in FIG. 2(b), and an equivalent electrical circuit thereof is shown in FIG. 2(a). A movable electrode 2 serving also as a weight is formed at the tip of a cantilever 1 by etching a silicon plate 6 from both of its surfaces. Fixed electrodes 3, 4 are made of a metal, such as aluminum, and are formed by vapor deposition onto glass plates 7, 8, respectively.

Assuming that the capacitances between the movable electrode 2 and the fixed electrodes 3 and 4 are $C_1$, $C_2$, respectively, as seen in FIG. 2(a), the values of $C_1$, $C_2$ are proportional to the displacement of the movable electrode 2, that is, the acceleration a(G). The most typical measurement method of the conventional capacitance type accelerometer operates to detect the acceleration a(G) from the absolute values of the capacitances $C_1$, $C_2$ or their difference $\Delta C$. As will be describe next, this measurement method involves the problem that the output characteristics fluctuate greatly due to the variance of the initial gap dimension between the movable electrode 2 and the fixed electrodes 3, 4 that occurs during production.

FIG. 3 shows an example of the relation between the displacement of the movable electrode 2 and the capacitance $C_1$, $C_2$ (PF) and the difference $\Delta C$ when the movable electrode 2 undergoes a displacement $\omega$ in accordance with the acceleration a(G). The diagram shows the case where, with the movable electrode 2 at its neutral point, the initial gap $d_o$ between the movable electrode 2 and the fixed electrodes 3, 4 is 3 $\mu$m. The displacement in the positive direction represents the state of the movable electrode 2 being moved in the upper direction (toward the fixed electrode 3 side), and the displacement in the negative direction represents the state of the movable electrode 2 being moved in the lower direction (toward the fixed electrode 4 side). As apparent from this graph, the closer the movable electrode 2 moves toward the fixed electrode 3, the larger the static electric capacitance $C_1$ will become; and, on the other hand, the closer the movable electrode 2 moves toward the fixed electrode 4, the larger the static electric capacitance $C_2$ will become. And also, the difference $\Delta C$ of the static electric capacitance $C_1$–$C_2$ will correspondingly increase respectively in the positive direction and in the negative direction from the ZERO neutral point (reference position) with displacement of the movable electrode 2 in the respective directions. Further, in case the movable electrode 2 stands at the neutral point, both of the static electric capacitances $C_1$, $C_2$ have the same value (about 6.5 pF). Thus, it is possible to determine the displacement of the movable electrode 2 by detecting any one of $C_1$, $C_2$ and $\Delta C$.

As shown in FIG. 3, the capacitances $C_1$, $C_2$ and their difference $\Delta C$ exhibit a large non-linearity with respect to the displacement $\omega$ of the movable electrode 2 (which is proportional to the acceleration $\alpha$) and so it is difficult to detect with high accuracy the acceleration $\alpha$ from such values. Incidentally, the capacitance C between the electrodes is given by the following formula, as is well known:

$$C = \frac{\epsilon_o s}{d} \tag{1}$$

where
 $\epsilon_0$: vacuum dielectric constant,
 s: area of electrode,
 d: gap between electrodes.

Since the capacitance C is inversely proportional to the gap dimension d, the non-linearity between acceleration $\alpha$ and values of $C_1$, $C_2$ and $\Delta C$ becomes great as shown in FIG. 3. As can be understood from the formula (1) and FIG. 3, if the initial gap $d_o$ between the movable electrode 2 and the fixed electrodes 3, 4 is greater than 3 $\mu$m when the production is complete, the sensitivity and non-linearity of the capacitance $C_1$, $C_2$ and their difference $\Delta C$ with respect to the change of the acceleration $\alpha$ will fluctuate greatly. Therefore, when the acceleration $\alpha$ is detected from the change in capacitance $\Delta C$, the variance of the initial gap dimension at the time of production must be an extremely small value. In practice, however, this conventional device has the drawback that the initial gap dimension at the time of production is not constant.

In addition to the problem of non-linearity inherent in the accelerometer device, as discussed above, the capacitance type acceleration sensor also is subject to problems relating to the construction and operation of the servo control systems used therewith. FIG. 1(b)

shows an example of a known capacitance type acceleration sensor and an associated servo control system.

In FIG. 1(b), a moving electrode 130 is supported by a silicon beam 133, and this moving electrode 130 is displaced in response to acceleration. Each of the fixed electrodes 131a, 131b for detecting the displacement of the movable electrode 130 and each of the fixed electrodes 132a, 132b for static electric servo-operation are opposed, with the movable electrode 130 being interposed between them. The movable electrode 130 is held to be ZERO potential.

A capacitance detector circuit 134 employs an A/C bridge for instance, and this detector circuit detects the difference ΔC between the static capacitance $C_1$ between the fixed electrode 131a and the movable electrode 130 and the static capacitance $C_2$ between the fixed electrode 131b and the movable electrode 130 (ΔC presents the displacement of the movable electrode 130), and this measure of ΔC is output via an amplifier 135 as the voltage value Va. This output value Vout (Va) becomes the sensor output, and the acceleration is detected on the basis of this sensor output.

Also, a static electric servo-operation is performed on the basis of the voltage value Va so that the movable electrode 130 is restricted to the reference position (the neutral point), in other works, so that ΔC becomes ZERO. More particularly, for example Vb+Va′ is applied to one side of the fixed electrodes 132a, 132b for static electric servo-operation, and Vb−Va′ is applied to the other side thereof, via a root circuit 136 and a voltage applying circuit 137, and the static electric force (attractive force) necessary for the static electric servo-operation is generated at each of the fixed electrodes 132a, 132b.

The root circuit 136 plays the role of a compensating circuit to compensate for the non-linearity of the static electric servo-operation mechanism. Namely, since the static electric force F generated at the fixed electrodes 132a, 132b is proportional to the square of the applied voltage, when no consideration is given to variations in the applied voltage, the inherent non-linearity of the static electric servo-operation mechanism will be made even larger. Accordingly, it is necessary to provide a compensating circuit 136 to compensate for said non-linearity of the static electric servo-operation mechanism.

That is, the static electric force F is expressed by the following equation.

$$F = \frac{\epsilon S V^2}{2d^2} \cdot D \qquad (2)$$

(here, $\epsilon$ is a dielectric constant, S is the area of the electrode; V is an applied voltage; and D is a duty of the applied voltage; in the conventional case, D=1, since the magnitude of the applied voltage is varied.)

$$V \propto \sqrt{F} \qquad (3)$$

And therefore, it is necessary to take the root of the voltage V applied to the fixed electrodes so as to compensate for the non-linearity of the static electric servo-operation mechanism.

In the case of the static capacitance type acceleration sensor which is driven by the static electric servo driving system described above, when the root circuit is used as a compensating circuit to compensate for the non-linearity of the static electric servo-operation mechanism, since the price of this circuit itself is expensive, the cost of the whole apparatus increases accordingly. Further, in the case of adjusting the output characteristics without utilizing such a root circuit, the cost of the adjusting increases because of the difficulty in accomplishing the adjusting, and also, the yield rate of the product becomes worse.

Further, in the case of this kind of static capacitance type acceleration sensor which is driven by a static electric servo driving system, since it is necessary to individually and separately provide the fixed electrodes for detecting capacitance and the fixed electrodes for the static electric servo-operation, the area of the electrodes is increased as well as the number of components, and thus the size of the apparatus becomes larger and the cost thereof also increases.

SUMMARY OF THE INVENTION

It is an object of the present invention to provide a capacitance type accelerometer which does not need a non-linearity compensation circuit and has a high production yield, thereby avoiding the drawbacks of the conventional technique described above.

A further object of this invention is to provide an acceleration detecting method and apparatus therefor of the static capacitance type having a static electric servo driving system in which non-linearity of the static electric servo-operation can be compensated without utilizing any expensive circuit components, in which the yield rate of the products is improved, and in which a constantly stabilized detecting of acceleration can be performed with high precision at a low voltage, while reducing the number of components, the cost and the size of the apparatus.

The objects described above can be accomplished by disposing at least one of the fixed electrodes in such a manner as to oppose a movable electrode formed at the tip of a cantilever by a technique for miniature etching of silicon, letting an electrostatic force act between both electrodes so that the capacitance between the movable electrode and the fixed electrode(s) reaches a predetermined value (that is, in such a manner as to restrict displacement of the movable electrode), controlling in this case the electrostatic force between both electrodes by a pulse width modulation system or providing the electrostatic force with a bias electrostatic force component so as to cause substantial linearization without using a linearization circuit, and taking out an output signal proportional to acceleration from this electrostatic force.

As a first approach, when an electrostatic force (whose magnitude is proportional to the square of the voltage applied between both electrodes) is subjected to feedback control by a pulse width modulation system, this pulse width is accurately proportional primarily to the acceleration to be detected. As a second approach, a relatively large bias electrostatic force is applied between the movable electrode and one of the fixed electrodes and the electrostatic force applied between the movable electrode and the other of the fixed electrodes is subjected to feedback control. In this case, the degree of the change of the voltage applied between both electrodes to generate the latter electrostatic force is substantially proportional primarily to the acceleration to be detected.

According to the two approaches described above, acceleration can be detected with high linearity and a high level of accuracy from the electrostatic force which is subjected to feedback control in such a manner as to restrict the position of the movable electrode, without using a linearization circuit.

Furthermore, the variable control of said static electric force, in other words, the variable control of the ratio of applying time per unit period of the applied voltage to the fixed electrodes is considered to be performed by employing at least one of pulse width modulation, of period modulation and of changing pulse number per unit period relative to the voltage to be applied to the fixed electrodes.

As stated above, the sensitivity and the zero point of the accelerometer, in general, have variances within certain ranges due to various factors at the time of production. Therefore, they must be adjusted in some manner. The accelerometer in accordance with the present invention can be adjusted easily because it can detect the acceleration linearly. As a result, the present invention can provide a capacitance type acceleration sensor with a high production yield.

These and other objects, features and advantages of the present invention will be described in more detail in conjunction with various preferred embodiments, as illustrated in the accompanying drawings.

BRIEF DESCRIPTION OF THE DRAWINGS

FIG. 21 is a schematic diagram of one form of a capacitance detector arrangement;

FIG. 22(A) to 22(D) are waveform diagrams relating to the capacitance detector of FIG. 21;

FIG. 23 is a diagram of an acceleration sensor arrangement of another embodiment according to this invention;

DETAILED DESCRIPTION OF THE PREFERRED EMBODIMENTS

Figure 1A:
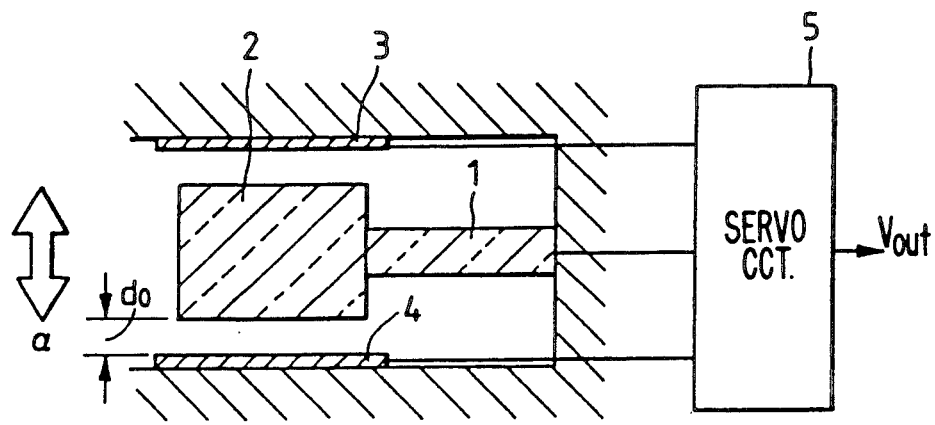
FIG. 1(a) shows the basic structure of an accelerometer of the type to which the present invention is applied.

Hereinafter, an embodiment of the present invention will be explained with reference to FIG. 1(a). The detection portion of the accelerometer in accordance with the present invention consists of a movable electrode 2 formed at the tip of a silicon cantilever 1 and fixed electrodes 3 and 4 arranged to oppose the movable electrode 2. The movable electrode 2 undergoes vertical displacement between the fixed electrodes 3 and 4 depending on the magnitude and direction of the acceleration $a(G)$ to be detected. The fixed electrodes 3, 4 and the movable electrode 2 are coupled electrically with an electrostatic servo circuit 5. Here, the movable electrode 2 is electrically coupled through the cantilever 1.

In operation, an electrostatic force is applied in a feedback control arrangement between the movable electrode 2 and the fixed electrode 3 or 4 so that the dimension of the gap between the movable electrode 2 and one of the fixed electrodes (the electrode 4 in the case of the drawing) attains a predetermined value $d_o$ and an output signal $V_{out}$ proportional to the acceleration $a$ can be derived from this value of electrostatic force. The electrostatic servo circuit 5 constitutes the gist of the present invention, and the details of this servo circuit 5 will be described later in this disclosure.

Figure 2A:
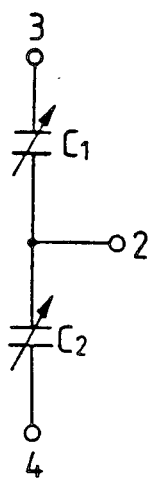
FIG. 2(b) shows a typical structure of a conventional accelerometer, and an equivalent electrical circuit thereof is shown in FIG. 2(a)
Figure 2B:
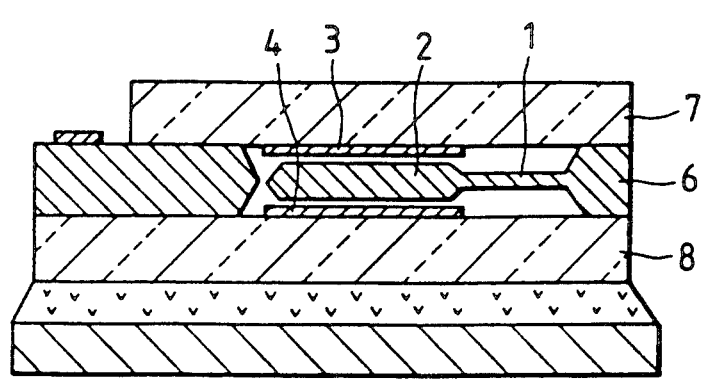
Figure 4A:
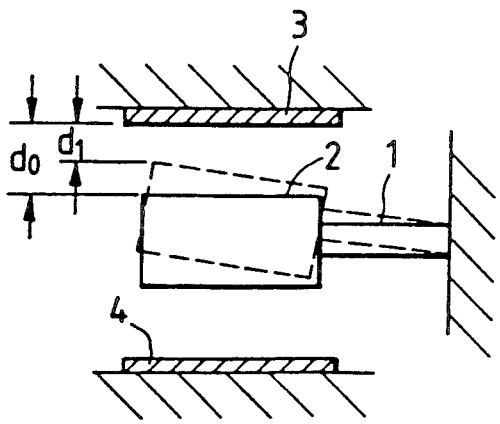
FIG. 4(a) and FIG. 4(b) show a variance state of the initial gap dimension between electrodes.
Figure 4B:
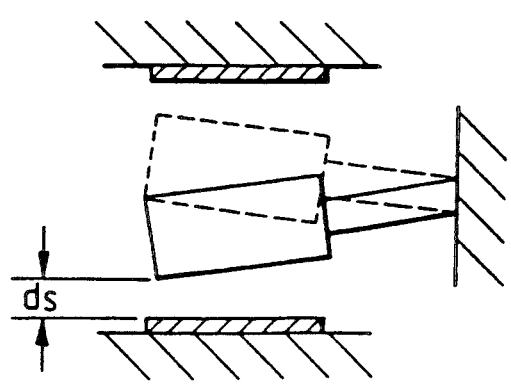

FIGS. 4(a) and 4(b) show an embodiment of the present invention which shows how to correct the variance state of the initial gap dimension between the electrodes. The solid line in FIG. 4(a) represents the state where the movable electrode 2 is at a desired position when the acceleration $a$ acting on the accelerometer is zero. The gap dimension between the movable electrode 2 and the fixed electrode 3 in this case is assumed to be $d_o$. As show in FIG. 2, however, the movable electrode 2 will not always have its neutral location positioned at the intermediate position between the fixed electrodes 3 and 4, due to the thermal stress of the bonded portion when the glass plates 7, 8 are bonded to the silicon plate 6. For example, the electrode 2 may be closer to the fixed electrode 3 in its neutral position, as represented by the dotted line in FIG. 4(a). This results from the fact that, during manufacture, a non-uniformity of the thermal stress at the bonded portion transfers to the fixed end of the cantilever 1 and the cantilever 1 undergoes displacement either upward or downward with its own fixed end being the support point. Assuming that the dimension of the gap between the movable electrode 2 and the fixed electrode 3 is $d_1$, this dimension $d_1$ takes various values at the time of production, and so the typical sensing method exhibits a large variance of output characteristics and invites a drop in the production yield.

Accordingly, in accordance with the present invention, the movable electrode 2 is caused to undergo displacement by an electrostatic force applied between the movable electrode 2 and at least one of the fixed electrodes 3 4 so that the movable electrode 2 comes to the intermediate position between the fixed electrodes 3 and 4 (the dimension of the gap $d_o$) whatever value the dimension of the gap $d_1$ between the movable electrode 2 and the fixed electrode 3 at the time of production may have, as shown in FIG. 4(a), and the dimension of the gap is held at a desired value (at $d_o$ in the drawing). Then, the output signal of the accelerometer is taken out on the basis of the electrostatic force applied between the electrodes.

The position of the movable electrode 2 when the acceleration $a$ is zero need not always be kept at the intermediate position between the fixed electrodes 3 and 4, and the dimension of the gap between the movable electrode and the fixed electrode may be kept at $d_s$, which is closer to one of the electrodes, as shown in FIG. 4(b). In this regard, the gap dimension between the movable electrode and the fixed electrodes can be kept at $d_o$ or $d_s$ by the electrostatic force however the gap dimension between the electrodes may fluctuate when producing a large number of accelerometers. Accordingly, the variance of the output characteristics, that has been the problem with the typical conventional sensing method, can now be reduced.

However, as already described, the DC voltage applied between the electrodes and the resulting electrostatic force have a non-linear relation. Accordingly, the gist of the present invention resides in that, when the output signal corresponding to the acceleration is taken out from the electrostatic force applied between the electrodes, while the movable electrode is kept at a desired position ($d_o$ or $d_s$) by the electrostatic force, the basic operation of the detection portion is provided with essential linearity. As a result, the production yield is improved and a high precision accelerometer can be provided at a reduced cost of production.

Figure 5:
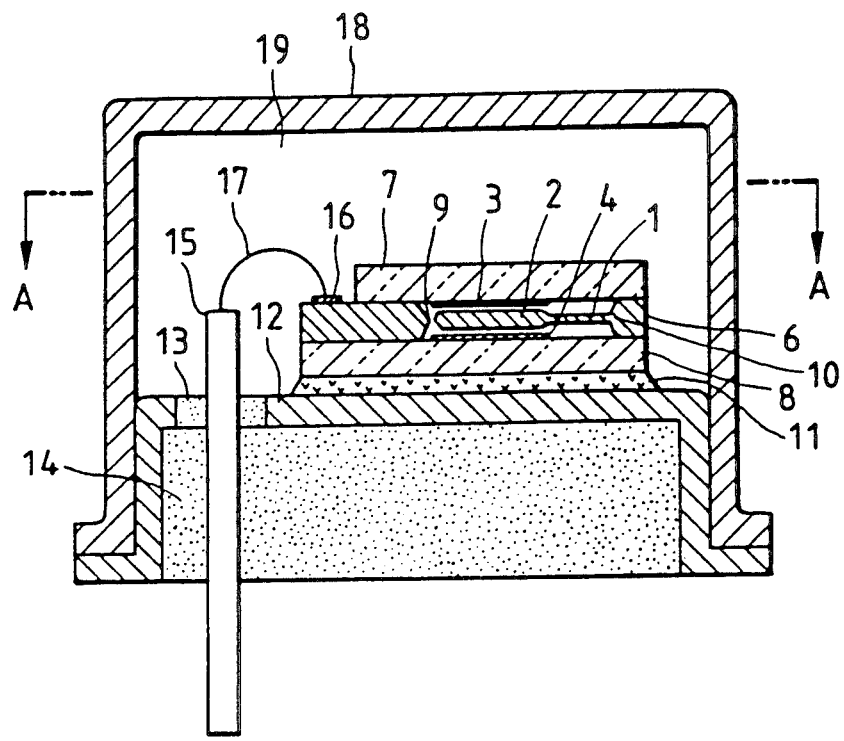
FIG. 5 is a detailed structural view of the detection portion of the accelerometer in accordance with the present invention.

FIG. 5 shows the detailed structure of the detection portion of the accelerometer in accordance with the present invention. The movable electrode 2 serving also as a weight is formed at the tip of the cantilever 1 by etching the silicon plate 6 from both of its surfaces. Since the periphery of the movable electrode 2 is separated from the silicon plate 6 by through-hole groove 9, the movable electrode 2 responds to the acceleration to be detected and is moved thereby vertically between the fixed electrodes 3 and 4, which are formed on the glass plates 7 and 8 by vapor deposition or the like, against the fixed end 10 of the cantilever 1 as a support point.

A sensor chip formed by bonding the glass plate 7, the silicon plate 6 and the glass plate 8 by anodic bonding or other method is fixed onto a stem 12 by use of an organic adhesive 11 (e.g. silicone rubber) having a small vertical elastic modulus (or soft adhesive). A hole 13 is bored on this metallic stem 12 and a lead 15 is hermetically sealed and fitted by a glass material 14. Since the thermal expansion coefficients of the stem 12 and glass plate 8 are mutually different, a soft silicon rubber or the like is suitable as the adhesive 11 lest the bond strain at this portion is transferred to the sensor chip above it.

Figure 1B:
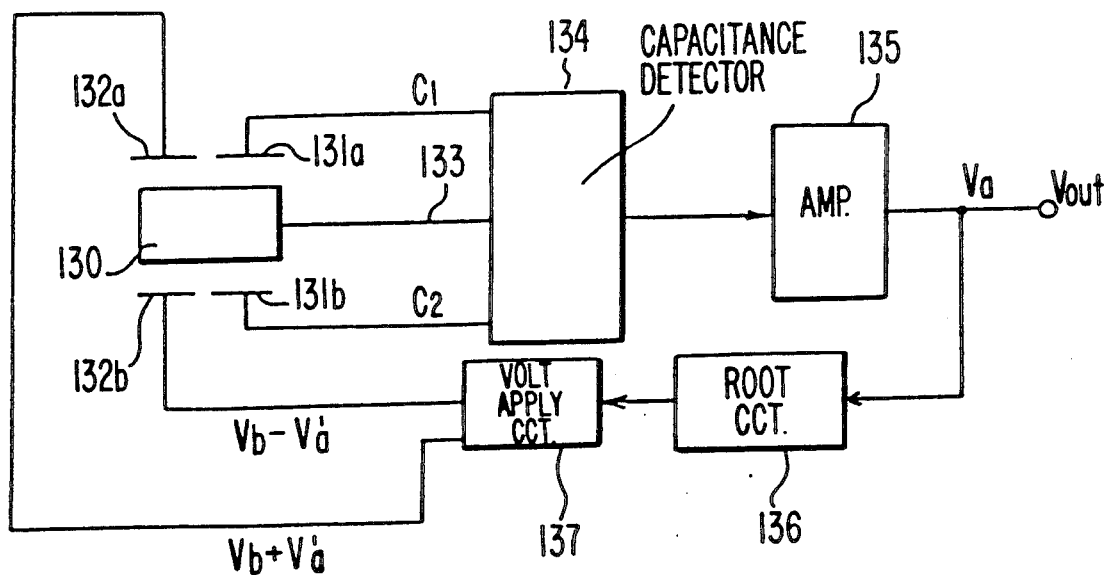
FIG. 1(b) is a schematic diagram of a conventional capacitance type acceleration sensor.

Next, lead wires 17 are wire-bonded to a lead extension electrode 16 and to the lead 15 and connected electrically thereto. The electrostatic servo circuit 5 and detection portion described with reference to FIG. 1 are connected electrically through the leads 15. A cap 18 is fitted to the stem 12 in a vacuum or nitrogen atmosphere and the inside of a chamber 19 is sealed hermetically.

Figure 6:
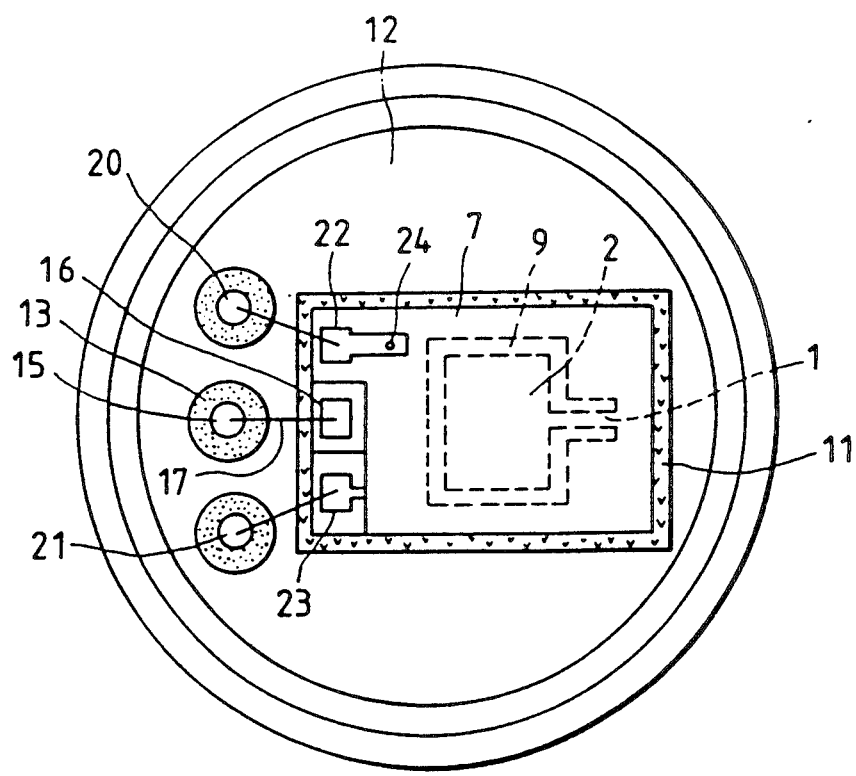
FIG. 6 is a plan view of the detection portion in FIG. 5.

FIG. 6 is a view taken along A—A of the detector portion assembly, that is, a plan view. The fixed electrode 3, the movable electrode 2 and the fixed electrode 4 are wired to the electrostatic servo circuit 5 through the lead extension electrodes 22, 16, 23 and the leads 20, 15, 21, respectively. The hole 24 is for electrically connecting the fixed electrode 3 formed on the lower surface of the glass plate 7 to the lead extension electrode 22 and wiring is provided by applying plating into the hole 24, or the like.

Figure 7:
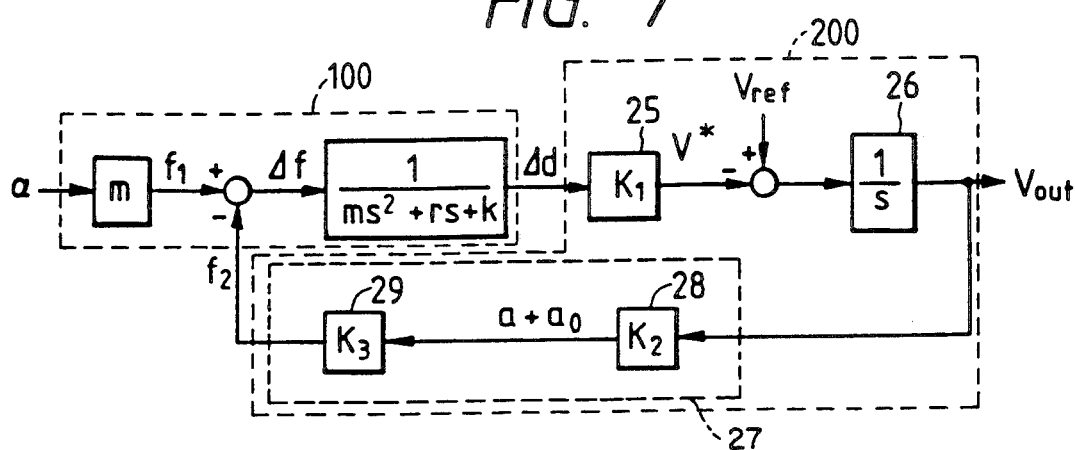
FIG. 7 shows an embodiment of an electrostatic servo control method in accordance with the present invention.

FIG. 7 illustrates an electrostatic servo control method in accordance with the present invention. When the movable electrode 2 having a mass m receives the acceleration $a(G)$ (1G=9.8 m/s$^2$), it moves due to the force $f_1$, represented by the formula (2) below, with respect to the fixed end 10 of the cantilever 1 representing the center:

$$f_1 = ma \qquad (4)$$

Assuming that the feedback electrostatic force acting on the movable electrode 2 is $f_2$, then the movable electrode 2 undergoes displacement by $\Delta d$ due to the force $\Delta f$:

$$\Delta f = f_1 - f_2 \qquad (5)$$

$$\Delta d = \frac{\Delta f}{ms^2 + rs + k} \qquad (6)$$

Here, s is a Laplace constant, r is a resistance coefficient and k is a spring constant of the cantilever 1. The coefficient r is determined by the density of a fluid around the movable electrode 2, the dimension of the through-hole groove 9 and the gap between the electrodes.

Since the dimension of gap d between the movable electrode and the fixed electrode changes due to the displacement of the movable electrode 2, $\Delta d$ can be detected from the electrical capacitance between the movable electrode and the fixed electrode.

In FIG. 7, block 100 corresponds to the electrodes 2 to 4 and the cantilever 1 in FIG. 1 and block 200 corresponds to the electrostatic servo circuit 5 in FIG. 1.

The displacement $\Delta d$ of the movable electrode 2 is converted to a voltage V* by a switched capacitor circuit 25 having a gain $K_1$ and is compared with a reference voltage $V_{ref}$. As will be described later, the switched capacitor circuit 25 applies a rectangular voltage wave train between the electrodes and the dimension d of the gap can be detected directly from the capacitance between the electrodes. The electrostatic servo circuit in the drawing is subjected to feedback control so as to satisfy the formula:

$$V_{ref} - V^* = 0 \tag{7}$$

and the gap between the movable electrode 2 and one of the fixed electrodes is kept at a constant value. As shown in FIG. 4(a) and FIG. 4(b), the dimension of gap $d_o$ or $d_s$ between the movable electrode 2 and the fixed electrode 4 can be kept always at a desired value irrespective of the magnitude and direction of the acceleration $\alpha$. At the same time, the problems resulting from the variance of the gap dimension between the movable electrode and the fixed electrode at the time of production can be overcome and a high performance accelerometer can be provided at a low cost of production.

The electrostatic servo mechanism is subjected to feedback control by the voltage applied between the movable electrode and the fixed electrode in such a manner as to satisfy the formula (7) and the output signal $V_{out}$ which is accurately proportional primarily to the acceleration $\alpha$ to be detected, is taken out through an integrator 26.

The electrostatic force $f_2$ is feedback-controlled linearly by a linear electrostatic force conversion portion 27 with respect to the acceleration $\alpha$ to be detected on the basis of the output signal $V_{out}$. As will be explained in detail later, the electrostatic force $f_2$ operates in such a manner as to attract the movable electrode 2 to the fixed electrode 4 and is controlled essentially linearly without the need of a linearization circuit. The linear electrostatic force conversion portion 27 consists of a pulse width modulator 28 having a gain $K_2$ and an electrostatic force conversion portion 29 having a gain $K_3$.

Figure 8:
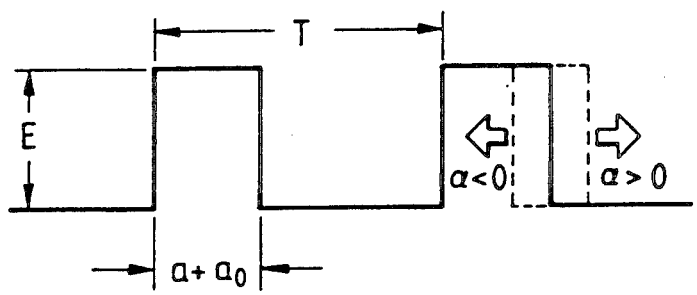
FIG. 8 is a detailed explanatory view of a linear electrostatic force conversion portion in FIG. 7.

Next, the details of the linear electrostatic force conversion portion 27 will be described with reference to FIG. 8. The output signal $V_{out}$ is modulated to a pulse train having a period T by the pulse width modulator 28 and its pulse width becomes $a + a_o$. Here, a is a variable portion of the pulse width which is varied in proportion to the acceleration $\alpha$, and $a_o$ is a base portion of the pulse width when the acceleration $\alpha$ is zero. The period T of the pulse train is determined so that the frequency of the pulse train becomes sufficiently greater than the natural frequency of the detection portion consisting of the cantilever 1 and the movable electrode 2. The natural frequency of the detection portion is 1.5(KHz) and in this case, the period T is set to 50($\mu$s). The voltage peak value E of is always constant.

The proportional gain $K_3$ Of the electrostatic force conversion portion 29 is determined physically and is given as follows when the movable electrode 2 is kept at ground potential and the pulse train described above is applied to the fixed electrode 4:

$$K_3 = \frac{\epsilon_o s E^2}{2 d_s^2} \tag{8}$$

The electrostatic force $f_2$ attracting the movable electrode 2 towards the fixed electrode 4 is given as follows:

$$f_2 = \frac{(a + a_o)\epsilon_o s E^2}{2 T d_s^2} \tag{9}$$

What is important in the formula (9) above is that the voltage peak value E of the pulse train applied between the movable electrode 2 and the fixed electrode 4, its period T and the gap dimension $d_s$ between the electrodes are constant and the electrostatic force $f_2$ is primarily proportional to $(a + a_o)$ obtained by the pulse width modulation of the output signal $V_{out}$ an is subjected to feedback control to a completely linear form without the need of a linearization circuit.

The base portion $a_o$ of the pulse width generates the electrostatic force for setting the gap dimension between the movable electrode 2 and the fixed electrode 4 to $d_s$ under the state where the acceleration is zero. In other words, the smaller the gap dimension d between the movable electrode 2 and the fixed electrode 4 at the time of production, the smaller becomes $a_o$, and the greater the d value, the greater becomes the $a_o$ value.

The variable portion a of the pulse width changes the electrostatic force $f_2$ in proportion to the acceleration $\alpha$ to be detected and is in agreement with the polarity of the acceleration $\alpha$ as expressed by the following formula:

$$\text{when } \alpha > 0, a > 0 \tag{10-1}$$

$$\alpha = 0, a = 0 \tag{10-2}$$

$$\alpha < 0, a < 0 \tag{10-3}$$

In other words, if the acceleration in the direction from the side of the fixed electrode 4 towards the side of the fixed electrode 3 is defined as $\alpha > 0$, the width of the pulse train increases when $\alpha > 0$ as represented by the dotted line in the drawing and decreases when $\alpha < 0$. The proportion of the increase or decrease of the pulse train changes linearly with respect to the acceleration $\alpha$ (accurately proportional primarily). As a result the following formula of output signal $V_{out}$ is established:

$$V_{out} \propto K m \alpha \tag{11}$$

where K is a proportional constant.

As expressed by the formula (11), the acceleration $\alpha$ can be detected with high linearity without being affected by the variance of the gap dimension between the movable electrode 2 and the fixed electrode 4 occurring at the time of production and by the influence of the spring constant k of the cantilever 1.

Furthermore, the output signal $V_{out}$ may be taken out from the output side of the pulse width modulator 28.

Incidentally, the switched capacitor circuit 25 detects the capacitance between the movable electrode 2 and the fixed electrode 4 by utilizing the pulse train for generating the electrostatic force that is applied between both electrodes 2 and 4. Though a detailed example of the detection circuit is described later, the capacitance $C_s$ can be detected from the following formula by establishing the charge Q in the capacitance $C_s$ formed between both electrodes, at the instant when the voltage E having a constant peak value is applied between both electrodes, and by transferring this charge Q to a known capacitance $C_{ref}$ at the instant when the voltage E becomes zero:

$$Q = C_s E \tag{12}$$

$$Q = C_{ref} E^* \tag{13}$$

From the formulas (10) and (11), $$cs = C_{ref} \frac{E^*}{E} \quad (14)$$

Therefore, the capacitance $C_s$ between both electrodes can be detected by measuring the voltage $E$ occurring in the known capacitance $C_{ref}$. If the capacitance $C_s$ is defined as follows, $$C_s = \frac{\epsilon_0 S}{d_s} \quad (15)$$

the electrostatic servo mechanism show in FIG. 7 operates as expressed by the formula (7) and the capacitance between both electrodes is controlled to $C_s$. Furthermore, the gap between the movable electrode 2 and the fixed electrode 4 is kept at a desired predetermined value $d_s$ without depending on the magnitude and direction of the acceleration $\alpha$ to be detected.

In the system shown in FIG. 7, the detection of the capacitance and the generation of the electrostatic force between the same electrodes and the fixed electrode opposing the movable electrode 2 are carried out in only one operation. Therefore, the structure of the detection portion is extremely simple.

Figure 9:
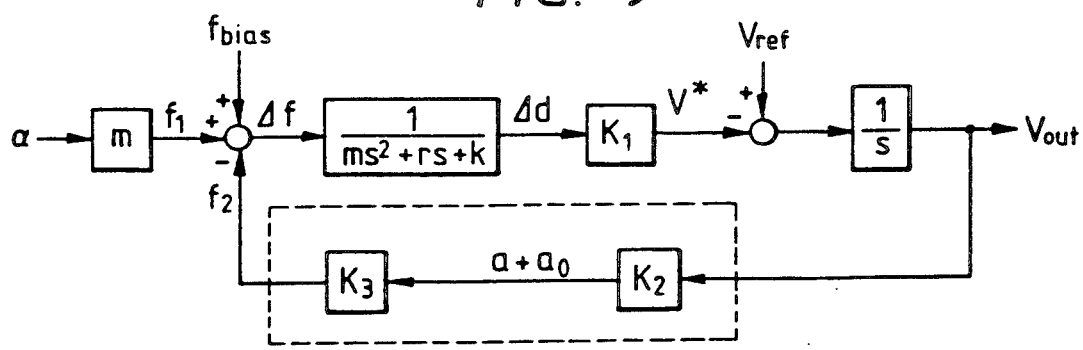
FIG. 9 shows another embodiment of the electrostatic servo control method in accordance with the present invention.

When the gap dimension d between the movable electrode 2 and the fixed electrode 4 is smaller than the desired set value $d_s$, detection of the acceleration $\alpha$ becomes difficult in accordance with the method shown in FIG. 4(b). To accommodate this problem, the detection system shown in FIG. 9 is employed. In this drawing, D.C. electrostatic force $f_{bias}$ is added bias-wise to the method of FIG. 7. The movable electrode 2 can be moved in the direction of the fixed electrode 3 by applying $f_{bias}$ between the fixed electrode 3 and the movable electrode 2. As a result, detection of the acceleration $\alpha$ can be carried out even when the gap between the movable electrode 2 and the fixed electrode 4 at the time of production is smaller than $d_s$. As shown in FIG. 4(a), the acceleration $\alpha$ can also be detected by holding the position of the movable electrode 2 at the intermediate position between the fixed electrode 3 and 4 by the electrostatic force in the feedback control arrangement as shown in FIG. 4(a).

Figure 10:
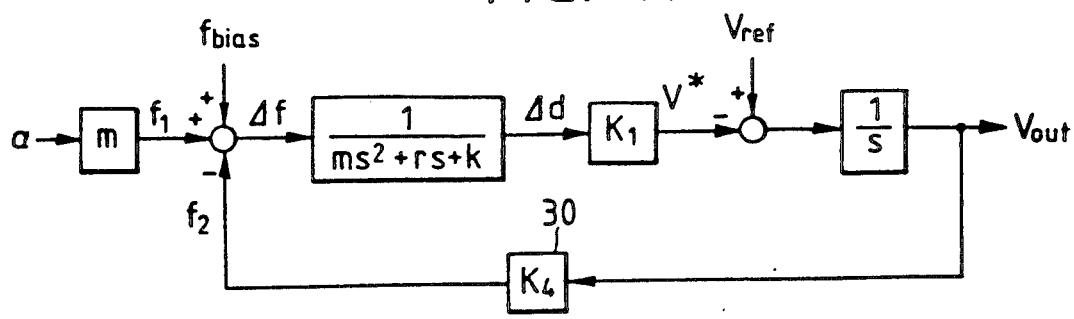
FIG. 10 shows still another embodiment of a sensing method of the accelerometer in accordance with the present invention.

FIG. 10 shows another embodiment of the sensing system of the acceleration sensor in accordance with the present invention. This system measures the gap between the movable electrode 2 and one of the fixed electrodes, effects a feedback control using an electrostatic force applied between the movable electrode 2 and the other of the fixed electrodes so that the gap dimension will attain a predetermined value irrespective of the direction and magnitude of the acceleration $\alpha$, and outputs a signal corresponding to the acceleration $\alpha$ from this electrostatic force. In other words, the capacitance between the movable electrode 2 and one of the fixed electrodes is measured (or in other words, the gap between the electrodes is measured) by applying the electrostatic force $f_{bias}$ of the pulse train having a predetermined period between them and the movable electrode 2 is displaced towards one of the fixed electrodes. The electrostatic force $f_2$ which causes displacement of the movable electrode 2 towards the other of the fixed electrodes is applied in the feedback control arrangement between the movable electrode 2 and the other of the fixed electrodes through a D.C. electrostatic force conversion portion 30 having a gain $K_4$ from the output signal $V_{out}$. As a result, the movable electrode 2 can be fed back and controlled to a desired position between the fixed electrodes 3 and 4. Since the following formula is established, the acceleration $\alpha$ can be detected from the electrostatic force $f_2$ applied between the movable electrode 2 and the other of the fixed electrodes:

$$V_{out} \propto m\alpha/K_4 \quad (16)$$

Figure 11A:
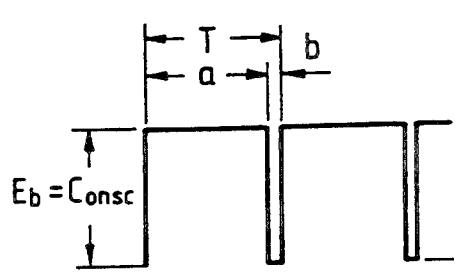
FIGS. 11(a) and 11(b) are detailed explanatory views of the electrostatic servo portion in accordance with the present invention.
Figure 11B:
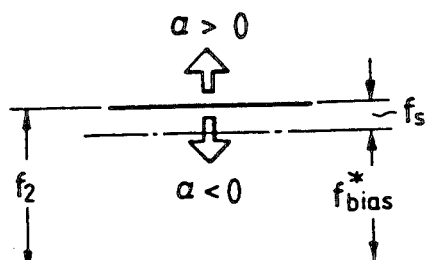

This operation of the electrostatic servo system will be described with reference to FIGS. 11(a) and 11(b). The item $f_{bias}$ to be applied between the movable electrode 2 and one of the fixed electrodes in FIG. 11(a) is a pulse train having period T and a voltage peak value $E_b$ (with $E_b$ being a constant value). The reason why the $f_{bias}$ item is applied as a pulse train is to measure the capacitance $C_s$ between the electrodes by a switched capacitor having a gain $k_1$ using the pulse train shown in FIG. 8. If the frequency of the pulse train is sufficiently higher than the natural frequency of the movable electrode system formed at the tip of the cantilever 1, the pulse-like electrostatic force $f_{bias}$ acts substantially as a D.C.-like electrostatic force on the movable electrode 2. In the pulse train, the zone where the voltage peak value is $E_b$ is indicated as "a" and the zone where it is zero is indicated as "b". When a>b, a sufficiently large electrostatic force $f_{bias}$ can be applied between the movable electrode 2 and one of the fixed electrodes by setting the voltage peak value $E_b$ to a large value.

Next, the item $f_2$ of the feedback electrostatic force shown in FIG. 11(b) will be explained. The following formula is established when the acceleration $\alpha$ is zero:

$$f_2 = f_{bias} + f_s \quad (17)$$

Here, $f^*_{bias}$ is the value obtained by substantially smoothing the pulse-like electrostatic force $f_{bias}$ to a D.C. component and fs is the electrostatic force necessary for setting the movable electrode 2 between the fixed electrodes 3 and 4. Incidentally, fs takes a positive or negative value depending on the relation of the positions between the position of the movable electrode 2 at the time of production and the position at which it is to be held. The drawing shows the case where it is positive. If the acceleration to be detected is $\alpha$, the feedback electrostatic force $f_2$ increases when $\alpha>0$ and decreases when $\alpha<0$.

As shown in the drawing, the electrostatic force $f_2$ acts D.C.-wise unlike the pulse width modulation system shown in FIG. 7. Since the linearity of the output signal $V_{out}$ becomes a problem in this case, the manner of dealing with this problem will be explained. The gain $K_4$ is given by the following formula and is proportional to $V_{out}$:

$$K_4 = \frac{\epsilon_0 S V_{out}}{2 d_s^2} \quad (18)$$

As a result, the output signal $V_{out}$ has a non-linearity with respect to the acceleration $\alpha$ as can be understood from the formulas (16) and (18).

Accordingly, the output signal $V_{out}$ is separated into a constant component V and a change component $\Delta V$ and is defined as follows:

$$V_{out} = V + \Delta v \quad (19)$$

Here, $\Delta V$ and V are those components which are responsive and are not responsive to the acceleration $\alpha$ to be detected, respectively. If the voltage peak value $E_b$ Of the pulse train of the electrostatic force $f_{bias}$ item is set to a large value, $F_{bias} > f_1$, since $f_2 > f_1$, $V > \Delta V$.

In this case, the gain $K_4$ is approximately expressed as follows and can be regarded as a substantially constant value:

$$K_4 = \frac{\epsilon_o s V}{2d_s^2} \quad (20)$$

The change component $\Delta V$ of the output signal corresponding to the acceleration $\alpha$ is given as follows:
$$\Delta V \propto m\alpha/K_4 \quad (21)$$

and $\Delta V$ is substantially proportional to the acceleration $\alpha$ to be detected. Therefore, the acceleration $\alpha$ can be detected accurately with substantially high linearity without requiring any linearization circuit by separating only the change component $\Delta V$ from $V_{out}$. Though FIG. 10 does not show this portion, the change component $\Delta V$ proportional to the acceleration can be detected easily by subtracting the predetermined constant component $V$ from $V_{out}$ by use of a differential amplifier.

Incidentally, when the constant component $V$ is 5 V and the change component $\Delta V$ is 0.1 V, linearity at the time of detection of the acceleration $\alpha$ is about 1%. If the voltage value $V$ of the steady component is set to a greater value, linearity can be further improved.

Figure 12:
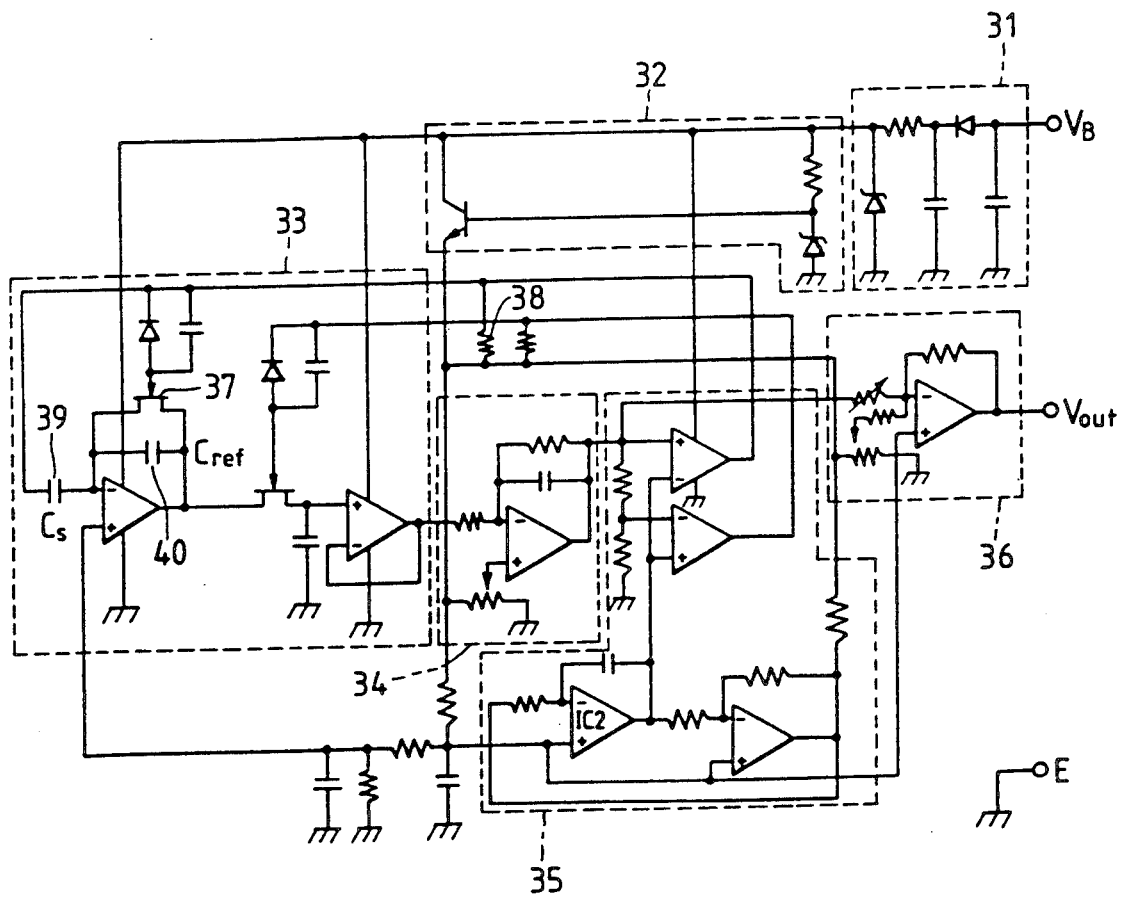
FIG. 12 shows a structural example of the detection circuit of the accelerometer in accordance with the present invention.

Next, FIG. 12 shows a structural example of the detection circuit of the accelerometer in accordance with the present invention. The drawing shows the circuit which detects the acceleration $\alpha$ by use of the electrostatic servo control method shown in FIG. 7 and the added $f_{bias}$ shown in FIG. 9 is not provided in the circuit shown in FIG. 12. This circuit consists of a power source protection circuit portion 31, a constant voltage circuit portion 32, a switched capacitor circuit portion 33, an integrator 34, a pulse width modulator 35 and an output regulation circuit portion 36. In the drawing, $V_B$ represents a voltage of a battery of a vehicle.

While the switch 37 is ON, a current is supplied from a resistor 38 between the movable electrode 2 and one of the fixed electrodes 4 at the detection portion of the accelerometer to charge the capacitance cs 39. Next, at the instant when the supply of the current is stopped, the switch 37 is turned OFF and the charge of the capacitance $C_s$ 39 is transferred to the known capacitance $C_{ref}$ 40. As a result, the value of the capacitance $C_s$ between the movable electrode 2 and the fixed electrode 4 is detected in accordance with the formula (14).

The electrostatic force applied between the movable electrode 2 and the fixed electrode 4 through the pulse width modulator 35 is feedback-controlled so that the capacitance $C_s$ attains a predetermined constant value. The output signal $V_{out}$ accurately proportional to the acceleration is taken out from this pulse width modulator through the output regulation circuit portion 36.

Furthermore, while the embodiments of the present invention described above show the case in which a measure of only one gap between the movable electrode and one of the two fixed electrode is carried out, as shown in FIG. 1, both of the gaps between the movable electrode 2 and the fixed electrodes 3 and 4 may be used in accordance with the present invention. In this case, the pulse width modulator 35 is modulated according to a deviation of the two gaps, and the output of the pulse width modulator 35 is fed back between the movable electrode and at least one of the two fixed electrodes.

Figure 13:
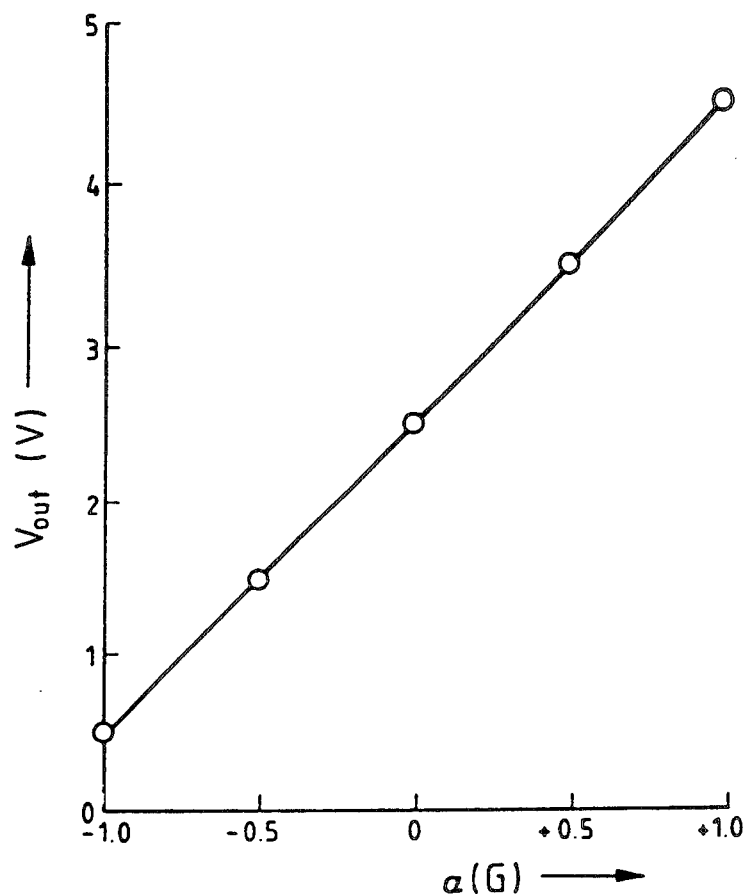
FIGS. 13 and 14 show the output characteristics of the accelerometer in accordance with the present invention.
Figure 14:
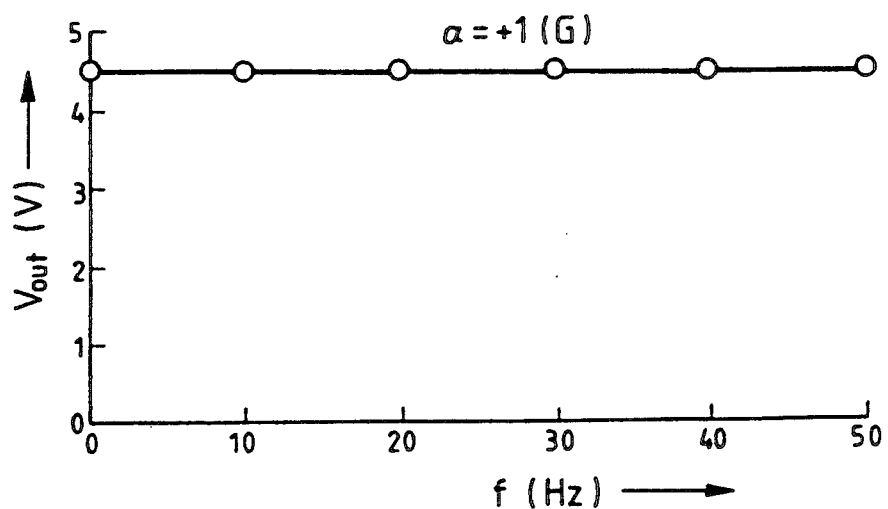

Next, FIGS. 13 and 14 show the examples of the output characteristics of the prototype accelerometer measured by use of the circuit of FIG. 12. FIG. 13 shows static characteristics and an acceleration from 0 to $\pm 1$(G) can be detected with high linearity. FIG. 14 shows dynamic characteristics and a detection sensitivity which is substantially constant in the frequency range of 0 to 50(Hz).

FIG. 13 shows the relation of the output voltage Vout to the acceleration (G), where the detecting range of the acceleration is set to $0 \sim \pm 1$ G according to this embodiment. Here, 1 G = 9.8 m/S². As is apparent from FIG. 13, when the acceleration is maximum ($\pm 1$ G) in the positive direction, the output Vout also becomes the maximum since D/T is the maximum. On the contrary, when the acceleration is the maximum ($-1$ G) in the negative direction, the output Vout becomes the minimum since D/T is the minimum, and in the case that the acceleration is 0, the output Vout takes the intermediate point since D/T = 0.5, Vout of the linear characteristics connecting these is obtained within the range of the acceleration $0 \sim \pm 1.0$ G.

As described above, the accelerometer in accordance with the present invention is suitable as an important sensor for controlling a car body.

Next, another embodiment of the detection structure capable of detecting acceleration with a high level of accuracy in accordance with the electrostatic servo method of the present invention will be described.

Needless to say, the movable electrode may be supported not only by the cantilever structure by also by a plurality of beams, such as double-end beam structures.

Figure 15:
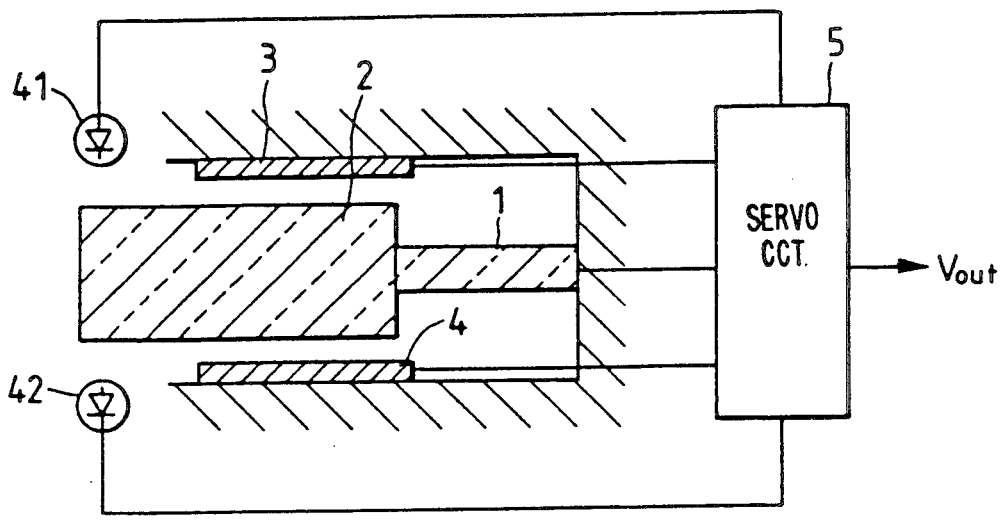
FIGS. 15 and 16 shows another embodiment of the structure of the detection portion of the acceleration sensor in accordance with the present invention.
Figure 16:
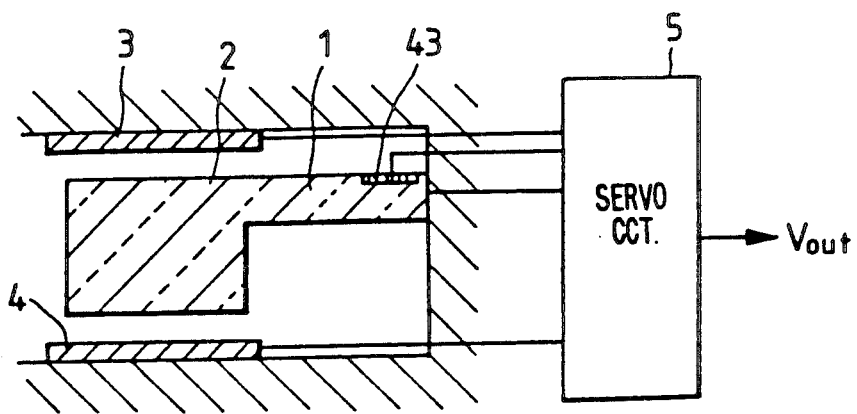

FIG. 15 and 16 show another embodiment of the structure of the detection portion in accordance with the present invention. FIG. 15 shows a system which measures the position of the movable electrode 2 by optical position sensing elements 41, 42 and holds the movable electrode 2 at a desired position between the fixed electrodes 3 and 4 by the electrostatic servo circuit 5. At this time the acceleration is detected from the electrostatic force applied in the feedback control arrangement between the movable electrode 2 and the fixed electrodes 3, 4 from the electrostatic servo circuit 5. The difference between this system and those shown in FIGS. 7, 9 and 10 is that the position measurement of the movable electrode is carried out by use of the optical position sensing elements 41, 42 in place of the switched capacitor circuit 25.

FIG. 16 shows the system which measures the position of the movable electrode 2 by a semiconductor strain gauge 43 formed on the cantilever 1, and the rest of the operations are the same as those of FIG. 15.

In accordance with the present invention, the electrostatic servo mechanism can be operated substantially linearly with respect to the acceleration to be detected by the electrostatic pulse width modulation or the electrostatic bias method while the movable electrode is held by servo control at a desired position. Accordingly, the acceleration can be detected with a high level of accuracy without the need for a linearization compensation circuit.

Since the basic principle of the detection portion is substantially linear, the variance of the output characteristics due to various factors during production can be reduced and the production yield can be improved.

As a result, the present invention can provide a capacitance type accelerometer which satisfies all of the requirements for high sensitivity, high impact resistance and high performance at a low cost of production.

Now, a further aspect of the invention which involves feedback control to both the fixed electrodes 3, 4 will be described with reference to an embodiment shown in FIG. 17.

At first, from the view point of the method of the invention, there are provided a movable electrode 2 which is displaced in response to acceleration and at least one pair of fixed electrodes 3, 4 located oppositely to each other on either side of the movable electrode 2. A voltage in the form of pulse train having a controllable duty factor is applied to the electrode 3 of the fixed electrodes 3, 4, and voltage in the inverted state of the same voltage is applied to other electrode 4 of the fixed electrodes, and a static electric force capable of controlling the positioning (static electric servo control) of the movable electrode 2 operates to displace the electrode 2 from a neutral position between the fixed electrodes 3, 4 in accordance with these applied voltages. Thus, when the movable electrode 2 is displaced from its reference position by acceleration, the displacement produces a change in static capacitance between the movable electrode 2 and the fixed electrodes 3, 4. In response, the static electric force is variably controlled by varying the duty ratio of applying time per unit period of the applied voltage to the fixed electrodes, so that the movable electrode 2 may be returned to its reference position (so that said static capacitance may return to its reference value), on the basis of the changing signal of this static capacitance. The acceleration is then detected on the basis of the average value of the applied voltage to the fixed electrodes or the changing signal of said static capacitance.

Here, the change of static capacitance between the movable electrode 2 and the fixed electrodes 3, 4 is considered to be obtained by such system as follows; namely, by detecting the static capacitance $C_1$ or $C_2$ between either one of the fixed electrodes 3, 4 and the movable electrode 2, or by detecting the difference $\Delta C$ between the static capacitance $C_1$ and $C_2$ and the like. Further, this detection is ordinarily performed by converting the detected quantity to a voltage value.

Further, the control necessary to return the movable electrode 2 to its reference position may be performed so that either the static capacitance $C_1$, $C_2$ and the difference $\Delta C$ of the static capacitance is made to be ZERO or some predetermined value.

Thus, an apparatus for performing the acceleration detecting method is comprised of a movable electrode 2 which is displaced in response to an acceleration; at least one pair of fixed electrodes 3, 4 located opposite each other with the movable electrode 2 being interposed between said fixed electrodes; a capacitance detector 45 for detecting the displacement of the movable electrode 2 on the basis of the change of static capacitance between the movable electrode 2 and the fixed electrodes 3, 4; a pulse width modulator 47 for generating static electric force by applying a pulse train to one side 3 of the fixed electrodes in response to output $V_0$ of capacitance detector 45 received via amplifier 46; an invertor 48 for generating a static electric force by inverting said pulse train produced by the pulse width modulator and by applying this inverted voltage to the other electrode 4 of the fixed electrodes.

The pulse width modulator is controlled to vary the duty ratio of applying time per unit period of the pulse train applied to said fixed electrodes, on the basis of signals identifying the variation of said static capacitance, so that a static electric force is generated to restrict the movable electrode 2 to its reference position.

An integrator 9 for detecting acceleration determines acceleration on the basis of the average value of voltage applied to said fixed electrodes, or on the basis of signals identifying the variation of said static capacitance.

According to this invention, the static electric servo-operation system controls the positioning of the movable electrode 2, basically using a voltage of pulse train type (for example, rectangular wave voltage), applied to one electrode 3 of the fixed electrodes, and the inverted voltage of said voltage of pulse train type is applied to the other electrode 4 of the fixed electrodes. That is, the static electric force operating on the movable electrode 2 is generated from both of the fixed electrodes 3, 4 by means of these applied voltages. This static electric force is variably controlled to restrict the movable electrode 2 to its reference position.

Namely, according to this invention, when the movable electrode 2 is displaced from its reference position due to acceleration and the like, since the static capacitance between the movable electrode 2 and the fixed electrodes 3, 4 is varied, the static electric force is variably controlled (feedback control) to return the movable electrode 2 to its reference position on the basis of the changing signal representing this static capacitance. This variable control of the static electric force is performed by varying the duty ratio of the applied time per unit period of the pulse train applied to said fixed electrodes.

More particularly, for example, when the acceleration operates in the direction of the fixed electrode 3 taking the movable electrode 2 as a reference, the movable electrode 2 is displaced toward the fixed electrode 4, on the basis of the reaction force against acceleration, in proportion to the amount of acceleration. In this case, the ratio of applied time per unit period of the pulse train to be applied to the fixed electrode 3 is made larger (in other words, the average value of voltage per unit period is made larger) to return the movable electrode 2 to its reference position (for example, the neutral point), so that the static electric force operating on the movable electrode 2 from the fixed electrode 3 side (since the movable electrode 2 is ordinarily at ZERO potential, this static electric force becomes the attractive force) becomes larger than the force at the fixed electrode 4 side. Further, when the duty ratio of applied time per unit period of the voltage to be applied to the fixed electrode 3 is made larger, the duty ratio of applied time per unit period of the voltage to be applied to the fixed electrode 4 is naturally made smaller because of the operation of the invertor 48. On the other hand, in case the acceleration operates in the direction of the fixed electrode 4, a reverse operation is performed compared to the case described above.

Thus, as described above, when the static electric force of the static electric servo-operation is feedback controlled by varying the duty ratio of applied time per unit period of the pulse train to be applied to the fixed electrodes (more particularly, varying the duty ratio of applied time per unit period of the voltage by pulse width modulation, pulse period modulation, pulse number modulation and the like), this duty ratio of applied time per unit period of the voltage is correctly proportional in a first order to the acceleration to be detected.

This means, referring to equation (1) described before, that the static electric force F is controlled by variably controlling the duty (D) while keeping the magnitude of the applied voltage value V constant, and the relation between D and F becomes as follows:

$$F \propto D \tag{22}$$

Thus, the static electric servo system may be operated in a substantially linear state. When the average value of this voltage applied to the fixed electrodes is converted to an acceleration value, a linearly detected value can be obtained.

Although the values $C_1$, $C_2$, $\Delta C$ are non-linear macroscopically, the displacement of the movable electrode 2 based on the acceleration is very small because of the restriction force (static electric force) provided by the fixed electrodes 3, 4. When this state is represented by a variation in the static capacitance, for example, under a detecting condition in the range of acceleration, such as $0 \sim \pm G$, $0 \sim 10$ Hz, since the capacitance is ordinarily varied within a very small range of ±30 FF (femto farad) from the reference point 0 as the center, it may be taken as a linearly variable signal. Accordingly, the linearly detected value of the acceleration may be also obtained on the basis of the variable signal of the static capacitance (concretely, an output signal Vout obtained by means of voltage amplifying on the basis of the variable signal of the static capacitance).

Figure 20:
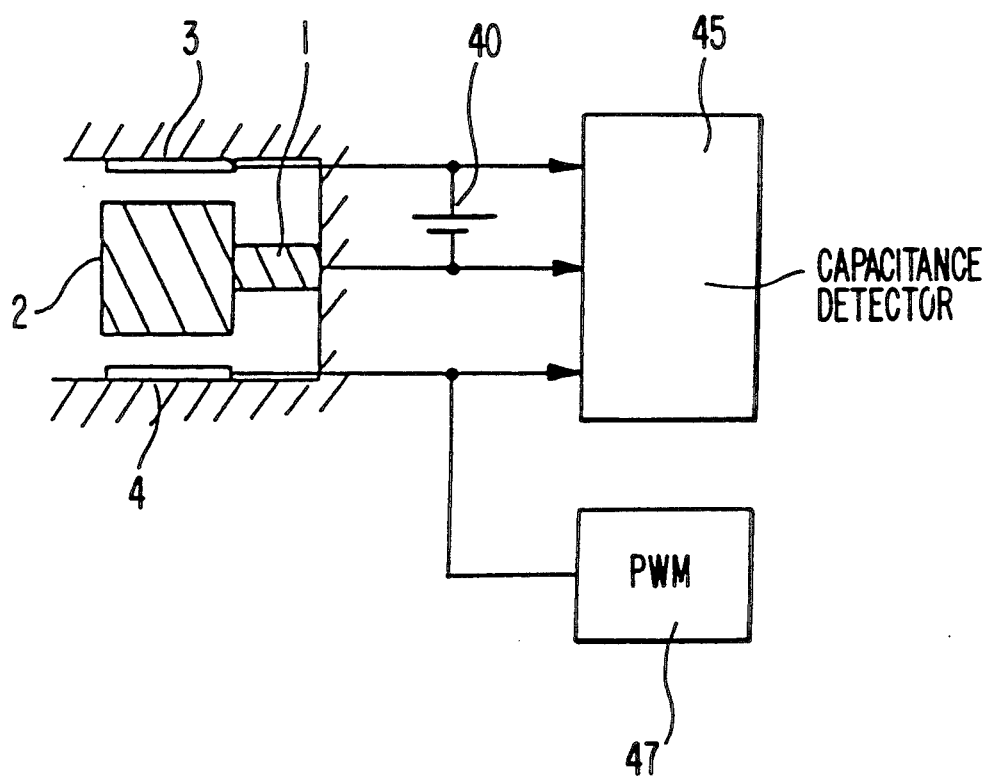
FIG. 20 is a schematic diagram of a sensor arrangement illustrating one form of a servo control system for applying a static electric force in accordance with the methods of FIGS. 9 and 10.

Further, according to the static electric servo-operation system by which mutually inverted signals ar applied to the fixed electrodes 3, 4 as provided by this invention, various advantages may be obtained as follows. These advantages will be described in comparison with the case of a static electric servo-operation system as shown in FIG. 20. FIG. 20 illustrates the static electric servo-operation system which has been described earlier in this disclosure. As shown in this FIG. 20, a reference potential 10 is applied to the fixed electrode 3, and a rectangular wave is applied to the fixed electrode 4 from a pulse width modulator 47.

Figure 17:
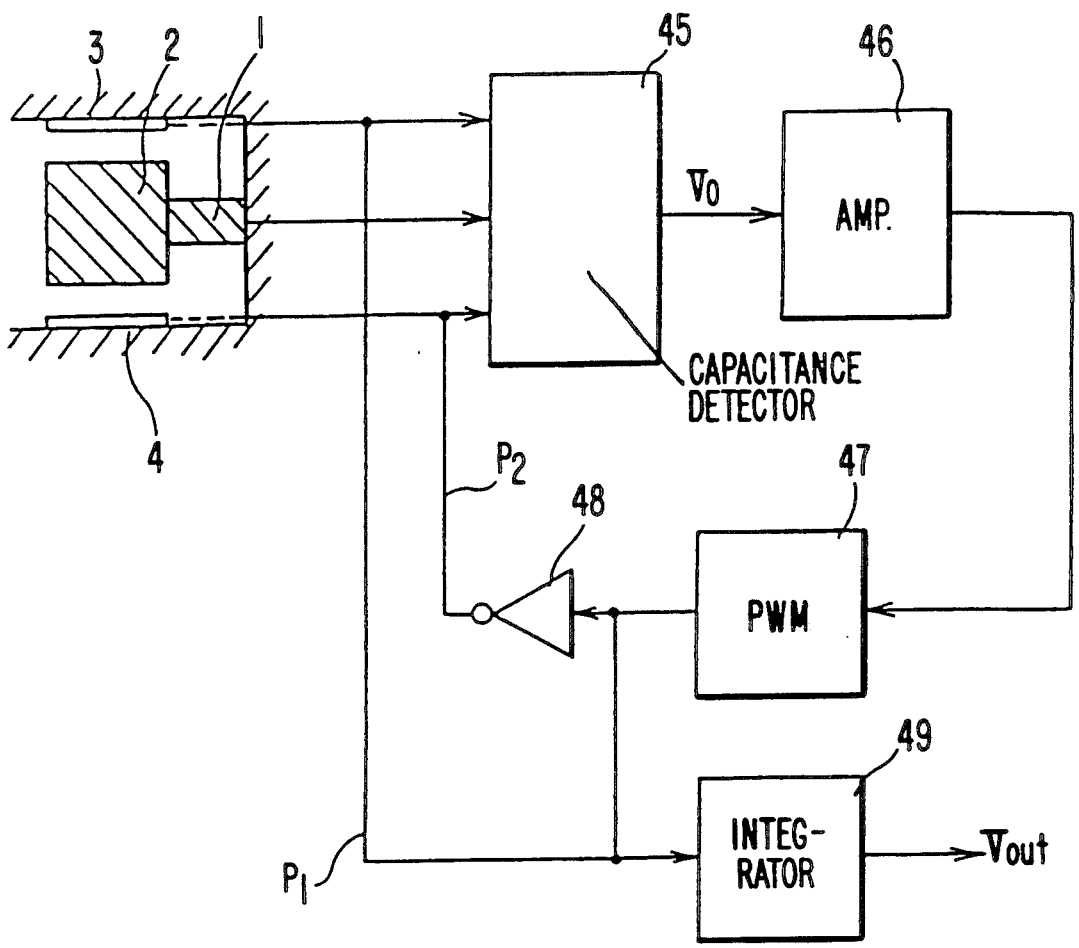
FIG. 17 is a schematic diagram of the servo control portion of sensor according to this invention.
Figure 19:
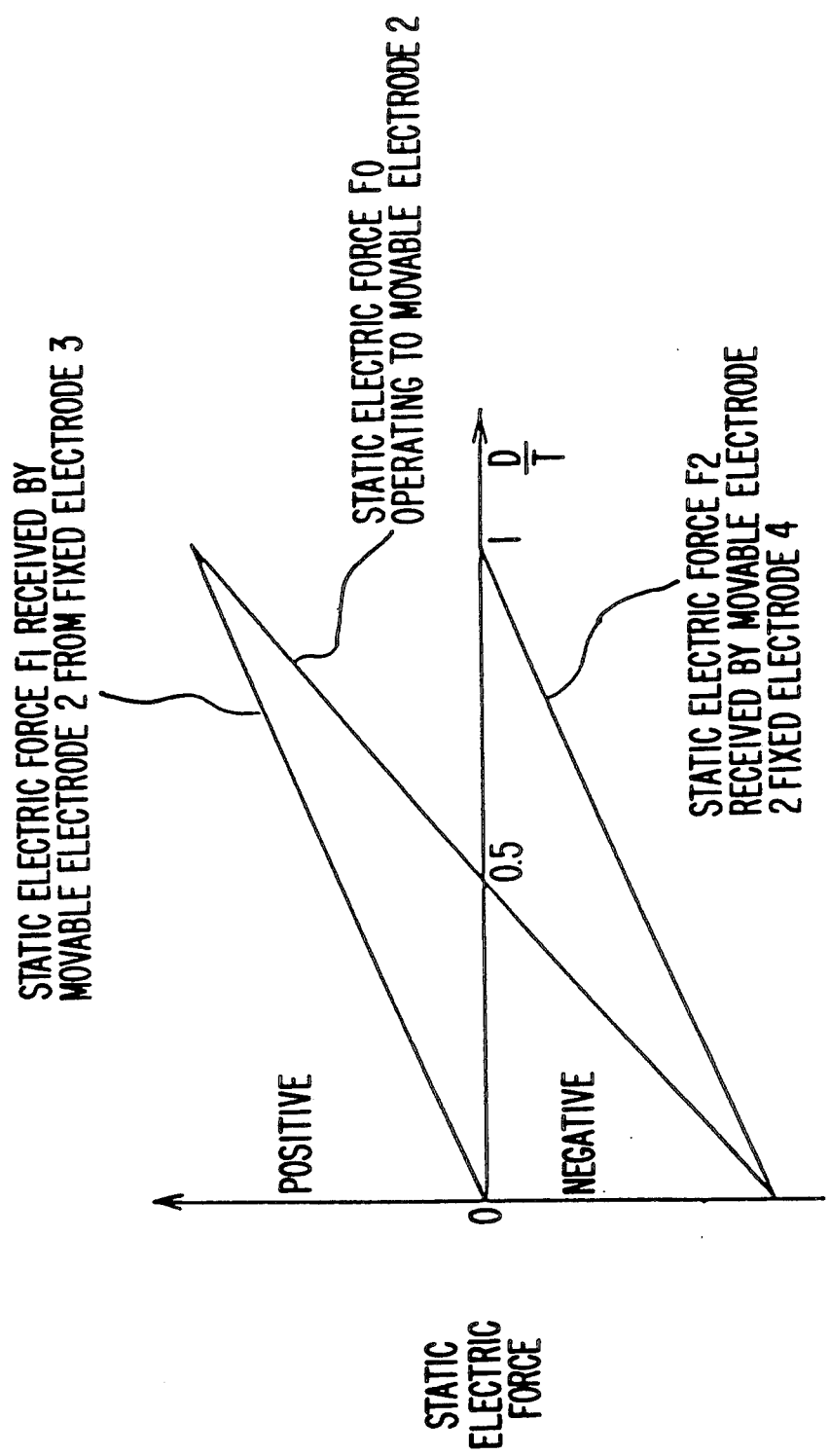
FIG. 19 is a graph illustrating the relation between the duty ratio of a voltage applied to fixed electrodes and the static electric force operating on the movable electrode.

A first advantage of the arrangement of FIG. 17 is that voltage amplitude of the rectangular wave may be $1/\sqrt{2}$ of that of the embodiment shown in FIG. 20. Namely, if the measuring width of the acceleration sensor is $K_1 G$ (1 G is the acceleration of the gravity), in the case of D/T=1, when the amplitude of rectangular wave voltage is equal to that of the voltage by which the static electric force of 1 G is provided, the static electric force of ±1 G may be applied to the movable electrode 2. However, according to the system as shown in FIG. 20, in order to produce the same performance as that provided by the static electric force of ±1 G in FIG. 17, since the static electric force exists only as an attractive force, it is necessary to apply about $0 \sim 2$ G of static electric force. This is done by applying a 1 G static electric force between the fixed electrode 3 and the movable electrode 4 beforehand, and varying the static electric force between the movable electrode 2 and the fixed electrode 4 with D/T of the rectangular wave. Namely, it is necessary to employ a rectangular wave having a voltage amplitude of D/T=1 so that the static electric force of 2 G is utilized. Now, since the static electric force operating between the parallel plates (electrodes) is proportional to the square of the voltage, as seen from the relation of equation (2), as seen in FIG. 19, $\sqrt{2}$ times the voltage is needed to generate 2 times the static electric force of that of the arrangement of FIG. 17. That is, by using the arrangement of FIG. 17, the amplitude of the voltage may be suppressed to $1/\sqrt{2}$ compared to the system as shown in FIG. 20 in which a constant voltage is applied to one of the fixed electrodes beforehand. Accordingly, when the acceleration sensor is employed as a sensor for an automobile, since the voltage of the battery is at most 15 Volts, to suppress the amplitude value of the voltage applied to the accelerometer is very advantageous.

Further, it has been considered that under the state in which force produced by the acceleration is always balanced with force produced by the static electric force, there may occur an unbalanced state depending on the initial condition or the transitional condition of the movable electrode 2. In the extreme state, the movable electrode 2 may touch the fixed electrode 3. According to such system as shown in FIG. 20, when the electrodes touch each other, since the constant reference voltage 10 is being applied between the movable electrode 2 and the fixed electrode 3, and furthermore, since the static electric force is proportional to the square of the distance between the electrodes, the movable electrode 2 cannot be separated from the fixed electrode 3 because of a very big static electric force operating therebetween, and thus the acceleration sensor becomes disabled. However, in the arrangement of FIG. 17, even if the movable electrode 2 touches the fixed electrode 3, since the voltage to be applied to the fixed electrode 3 becomes almost ZERO under the control condition $D/T \div 0$, the movable electrode 2 is able to return to its balanced position. Namely, it is able to be stably operated without being disabled.

According to this invention, using a static electric servo-operation system, a pulse train (including the inverted voltage) having a variable duty ratio is applied to the fixed electrode. However, the magnitude of this voltage is held to have a constant value V*, and therefore, a detection voltage $C_1V^*$, $C_2V^*$, $(C_1-C_2)V^*$ may be derived from between the fixed electrodes using an operational amplifier, for instance, of using this voltage V*. And thus, it is not necessary to separate the fixed electrodes for detecting capacitance (to take the variation of the static capacitance) from those for the static electric servo-operation, unlike the arrangement shown in FIG. 1(b). Accordingly, it is possible to reduce the number of fixed electrodes together with the number of terminals, and also to reduce the size and cost of the whole apparatus.

The capacitance detector 45 detects the capacitance difference $\Delta C$ and converts this value to a corresponding output voltage. This output voltage is amplified by an amplifier 46, while performing phase compensation, and is then transferred to a pulse width modulator 47, as seen in FIG. 17. The pulse width modulator 47 outputs the rectangular wave voltage in the pulse train state, the pulse width of which varies to the output from the amplifier 46. The output from this pulse width modulator 47 is applied to the fixed electrode 3 via a signal line $P_1$, and also it is inverted by an invertor 48 and applied to the fixed electrode 4 via a signal line $P_2$. Further, the movable electrode 2 is set to be at ZERO potential.

Each of the fixed electrodes 3, 4 generates a static electric force on the basis of these applied voltages. These static electric forces operate as attractive forces to the movable electrode 2, and the static electric force of the fixed electrode 3 moves the movable electrode 2 toward the upper direction in the drawing (this static electric force is represented as the static electric force $F_1$ in the positive direction), and also, the static electric force of the fixed electrode 4 moves the movable electrode 2 toward the lower direction in the drawing (this static electric force is represented as the static electric force $F_2$ in the negative direction). Accordingly, the total static electric force $F_0$ operating on the movable electrode 2 is represented by the sum of $F_1$ and $F_2$ $[F_0 = F_1 + (-F_2)]$. In other words, in the case of no acceleration where the static electric force $F_1 = F_2$ the movable electrode 2 is held to be at the neutral point. In case the static electric force $F_1 > F_2$, the resultant force operates to move the movable electrode 2 toward the upper direction. In case the static electric force $F_1 < F_2$, the resultant force operates to move the movable electrode 2 toward the lower direction.

FIG. 18 shows the pulse width modulated (duty control) of the rectangular wave voltage to be applied to the fixed electrode 3, and the inverted voltage to be applied to the fixed electrode 4. FIG. 19 shows the respective static electric forces $F_1$, $F_2$ operating on the movable electrode 2 from the fixed electrodes 3, 4 and the sum of them (the resultant static electric force $F_0$), in which the static electric forces $F_1$, $F_2$ and the total static electric force $F_0$ may be varied with the linear characteristics by continuously varying the duty ratio [D (pulse width)/T (period)].

In the case of $D/T = 0$ in FIG. 19 for instance, since the voltage applied to the fixed electrode 3 is about ZERO in FIG. 17, and the inverted voltage applied to the fixed electrode 4 becomes the maximum, the static electric force $F_1$ becomes ZERO, the static electric force $F_2$ becomes a maximum, and also the resultant static electric force $F_0$ becomes a maximum in the negative direction. In the case of $D/T = 1$, then the reverse relation to the case of $D/T = 0$ is obtained. In the case of $D/T = 0.5$, since the static electric force $F_1$ also becomes equal to $F_2$, the total static electric force $F_0$ becomes ZERO, the movable electrode 2 is restrained at the neutral point (initial position), in the case of no acceleration. And also, in the case of $D/T = 0.25$, the duty ratio of pulse width per 1 period of the rectangular wave voltage respectively applied to the fixed electrodes 3 and 4 becomes 1 : 3, and the ratio of the static electric forces $F_1$ and $F_2$ also becomes 1 : 3 in proportion to the above duty ratio, and then a different component of said forces operates on the resultant movable electrode 2 as the static electric force $F_0$ in the negative direction. And thus, the resultant static electric force $F_0$ is varied with a linear characteristic in the positive direction and in the negative direction depending on D/T, taking $D/T = 0.5$ as the ZERO crossing point. Further, with respect to the voltages $V_1$, $V_2$ applied to the fixed electrodes, it is impossible to make D/T ZERO, since they are used as the voltage detection value of $C_1$, $C_2$ or $\Delta C$ as will be described later.

According to this embodiment, when the movable electrode 2 is displaced by the acceleration from outward (the displacing direction of the movable electrode 2 is reverse of the acceleration direction), the ratio D/T is duty controlled (here, pulse width modulation) to the position where $\Delta C$ becomes ZERO by the pulse width modulator 47 on the basis of the output $V_0$ corresponding to the difference component $\Delta C$ of the static electric capacitance $C_1$, $C_2$. For example, when acceleration is generated in the positive direction at a maximum value (maximum in the measuring range) and the movable electrode 2 is displaced to the maximum extent in the reverse direction (the fixed electrode 4 side), the pulse width modulation is performed so that D/T becomes a maximum in the set range on the basis of the maximum $-\Delta C$. In this case, the static electric force $F_0$ becomes a maximum in the positive direction and is cancelled by the acceleration displacement force (reaction force) in the negative direction. Then the movable electrode 2 is servo controlled to the neutral point (the position where $\Delta C$ becomes ZERO).

On the other hand, when an acceleration is generated in the negative direction to a maximum value and the movable electrode 2 is displaced to the maximum extent in the reverse direction (the fixed electrode 3 side), the pulse width modulation is performed so that D/T becomes a minimum in the set range on the basis of the maximum output of $\Delta C$. In this case, the resultant static electric force $F_0$ becomes maximum in the negative direction and is cancelled by the acceleration displacement (reaction force) in the positive direction. Then the movable electrode 2 is returned to the neutral point as described before.

The D/T control is performed so that $\Delta C$ always becomes ZERO, corresponding to the variation of the movable electrode 2 and the direction thereof depending on the degree of the acceleration and the direction thereof. As a result, the linear output voltage (average value) Vout proportional to the acceleration may be obtained by integrating the pulse width modulation voltage which is D/T controlled, using the integrator 49.

Now, an example of the capacitance detector 45 will be described along with its operation (detecting operation of the difference $\Delta C$ of the static capacitance) with reference to FIG. 21.

Figure 18A:
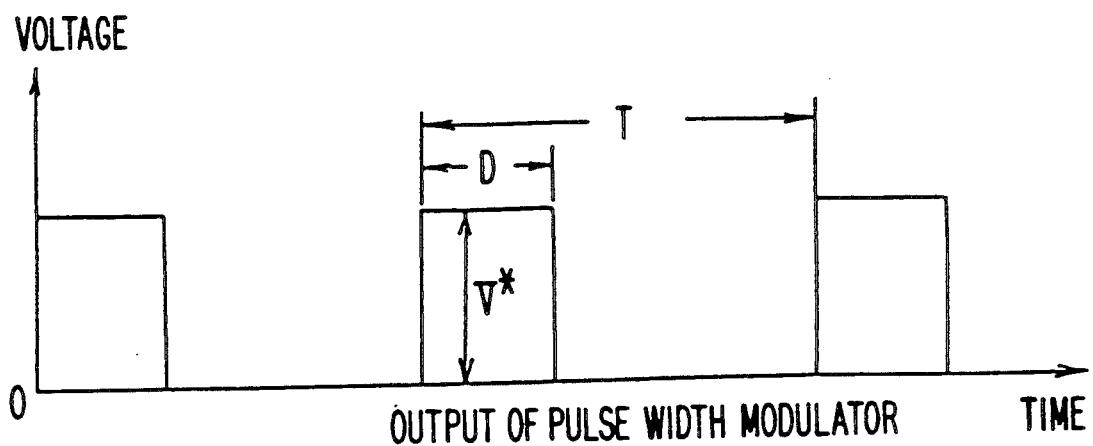
FIGS. 18(a) and 18(b) are wave shape diagrams of the output signals of a pulse width modulator and an invertor, respectively.
Figure 18B:
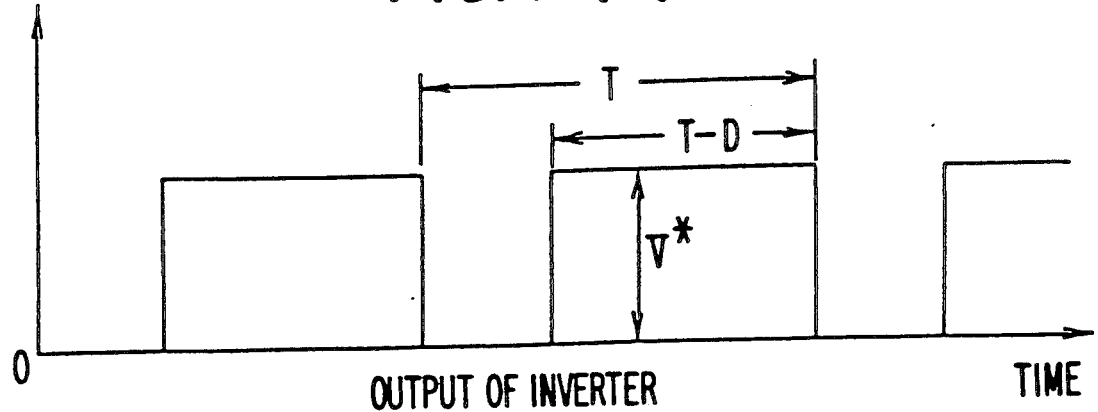

In FIG. 21, for the convenience of description, the static electric capacitance between the movable electrode 2 and the fixed electrode 3 is indicated as $C_1$, and the static electric capacitance between the movable electrode 2 and the fixed electrode 4 is indicated as $C_2$. The output $V_1$ of the pulse width modulator 7 and the output $V_2$ of the invertor 8 connected to $C_1$, $C_2$ are shown in FIGS. 18(a) and 18(b). The connection point a of $C_1$, $C_2$ namely the movable electrode 2, is connected to the negative terminal of an operational amplifier 111, and a condenser 120 of capacitance Cs and a switch 112 are connected in parallel between the negative terminal and the output terminal. The positive terminal of the operational amplifier 111 is connected to ground, and the negative terminal is driven to a similar potential to ground by means of the feedback connection of the operational amplifier 111. Thus, the potential of the movable electrode 2 is held at ZERO. The output of the operational amplifier 111 is connected to the input of a sampler 113.

Next, the operation of the capacitance detector 45 will be described on the basis of the operating wave shapes as shown in FIG. 22(A) to FIG. 22(D).

A pulse $\Phi_R$ applied to the switch 112 before the time when the rectangular wave voltage $V_1$ rises up, and the switch 112 is placed in the ON state for a constant period of time, and the condenser 120 of capacitance Cs is discharged. Then the output Vs of the operational amplifier 111 is made to be ZERO. After that, when the switch 112 is in the OFF state, $V_1$ rises up, and contrary to this, the inverted voltage $V_2$ goes down, and then $C_1$ is charged and $C_2$ is discharged. At this time, the charge $C_1$ transferring from $C_1$ to Cs (it appears that the charge is transferred by the current flowing during the time of charging/discharging process), and charge $Q_2$ transferring from $C_2$ to $C_s$ are represented by the following equations:

$$Q_1 = -C_1 V^* \quad (23)$$

$$Q_2 = -C_2 V^* \quad (24)$$

Here, $V^*$ is the voltage value of the rectangular wave voltage $V_1$, $V_2$.

Further, since the charge $Q_s$ stored in the capacitance $C_s$ is equal to the sum of $Q_1$ and $Q_2$ it is represented as follows:

$$Q_s = Q_1 + Q_2 = -(C_1 - C_2)V^* \quad (25)$$

The voltage V of the capacitance $C_s$ is represented by the following equations:

$$V = \frac{Q_s}{C_s} = -(C_1 - C_2)\frac{V^*}{C_s} \quad (26)$$

The voltage across the capacitance $C_s$ is equal to the output voltage $V_s$ of the operational amplifier 111. Namely, at this time, by sampling the output $V_s$ of the operational amplifier 111 with the sampler 113, it is possible to detect the value of $\Delta C$ of $C_1$, $C_2$ multiplied by $V^*$ as the voltage converted value. Namely, the output of the operational amplifier 111 is sampled with the sampler 113, and the voltage $V_0$ corresponding to $\Delta C$ is output. This output voltage $V_0$ becomes the output of the capacitance detector 45.

With a capacitance detector 5 having such a construction as this, the static electric capacitance difference $\Delta C$ of $C_1$, $C_2$ may be detected by utilizing the pulse voltage $V_1$, $V_2$ employed for the positioning control (static electric servo control) of the movable electrode 2; in other words, it is possible to detect the displacement of the movable electrode 2 based on acceleration.

Thus, the following effects are established by this embodiment.

(1) The movable electrode 2 being displaced by an acceleration is controlled by the static electric force of the static electric servo mechanism (fixed electrodes 3, 4), and the static electric servo mechanism may be linearly operated by duty control on the basis of the rectangular wave pulse train applied to both of the fixed electrodes 3, 4. This is caused by the fact that the static electric force F is linearly proportional to the duty D as seen from the equation (22). Accordingly, without utilizing an expensive linearizing circuit for compensation as in the case of the conventional root circuit of FIG. 1(b), the static electric servo mechanism may be substantially linearly operated by utilizing a relatively low cost pulse width modulator and invertor. Also, a detecting of acceleration with high precision may be performed by ensuring a linear operation of the static electric servo system.

(2) Also, sensors generally have some deviation in sensitivity and ZERO point within a predetermined range due to various factors. Therefore, it is necessary to adjust them with some suitable method. However, the acceleration sensor of this invention may be easily adjusted, since the acceleration can be linearly detected. As a result of this, it is possible to provide a capacitance type acceleration sensor with good production characteristics.

(3) Further, according to this invention, since mutually inverted voltages are applied to the fixed electrodes, the voltage value becomes $1/\sqrt{2}$ compared to the system of FIG. 20, and also, even if the movable electrode touches the fixed electrode, they can be easily separated from each other.

(4) Furthermore, according to this invention, an operational amplifier 111 as shown in FIG. 21 is employed as a capacitance detector 45, and the signal value corresponding to $(C_1 - C_2) V^*$ from the $V_1$ voltage value $V^*$ of the voltage $V_1$, $V_2$ to be applied to the fixed electrodes for the static electric servo, and then $\Delta C$ of $C_1$, $C_2$ from the signal value, and thus the fixed electrodes 3, 4 may be used both for the static electric servo and for detecting the variation of capacitance (displacement). Accordingly, it is possible to reduce the number of electrodes and the terminals, and to realize a simplification of producing process and a cost reduction thereof.

(5) Also, when a silicon beam 1 is formed by a fine machining technique, as in the case of the disclosed embodiments, since gaps between the fixed electrodes and the movable electrode may be set to very small values, the required static electric force may be also set to a small value correspondingly, and thus an acceleration sensor of low voltage type may be produced.

FIG. 23 is a structural view of a further embodiment of this invention.

An acceleration sensor of this embodiment has the same structure and operation as those of the embodiment of FIG. 17 relative to the silicon beam 1, the movable electrode 2, the fixed electrodes 3, 4, capacitance detector 45, amplifier 46, pulse width modulator 47 and invertor 48. Its different point is in that the detecting signal (sensor output) Vout indicating the measures of acceleration is taken out of the amplifier 46, unlike the case of the other embodiment in which the pulse width modulated signal is taken out of integrator 49.

Here, while the output of the amplifier 46 is based on the output V of the capacitance detector 45, this output may be taken out as $-(C_1 - C_2)V^*/C_s$ as the equation (26) as described before, for instance. In the other words, it may be taken out as a voltage in which $\Delta C$ is multiplied by a predetermined coefficient (e.g. $V^*/C_s$).

Figure 3:
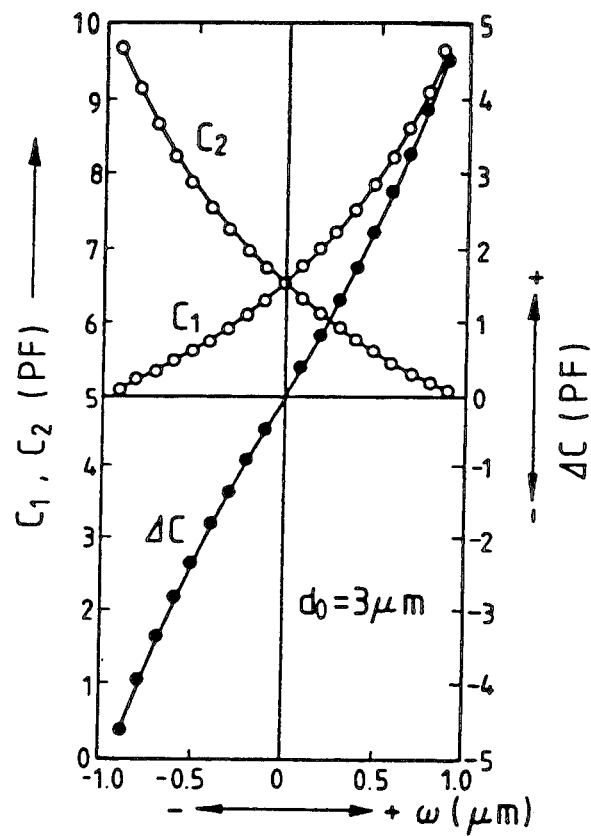
FIG. 3 is a diagram showing the relation between the displacement of a movable electrode and the capacitance in the conventional accelerometer.

As described before, although $\Delta C$ is non-linear macroscopically as shown in FIG. 3, the displacement of the movable electrode 2 based on the acceleration is very small. Thus, when this displacement is represented by the variation of the static electric capacitance, since it is varied within a very small range of $\pm 30$ FF (femto farad) smaller than a pF unit, it may be taken as a linearly variable signal. Accordingly, a detected value proportional to the acceleration may be also taken out on the basis of the output Vout from the amplifier 46. Even if the output Vout is taken out by multiplying $V^*$ with either the static electric capacitance $C_1$ or $C_2$ instead of $\Delta C$, a detected value proportional to the acceleration may be taken out for the same reason as the case of $\Delta C$.

Figure 24:
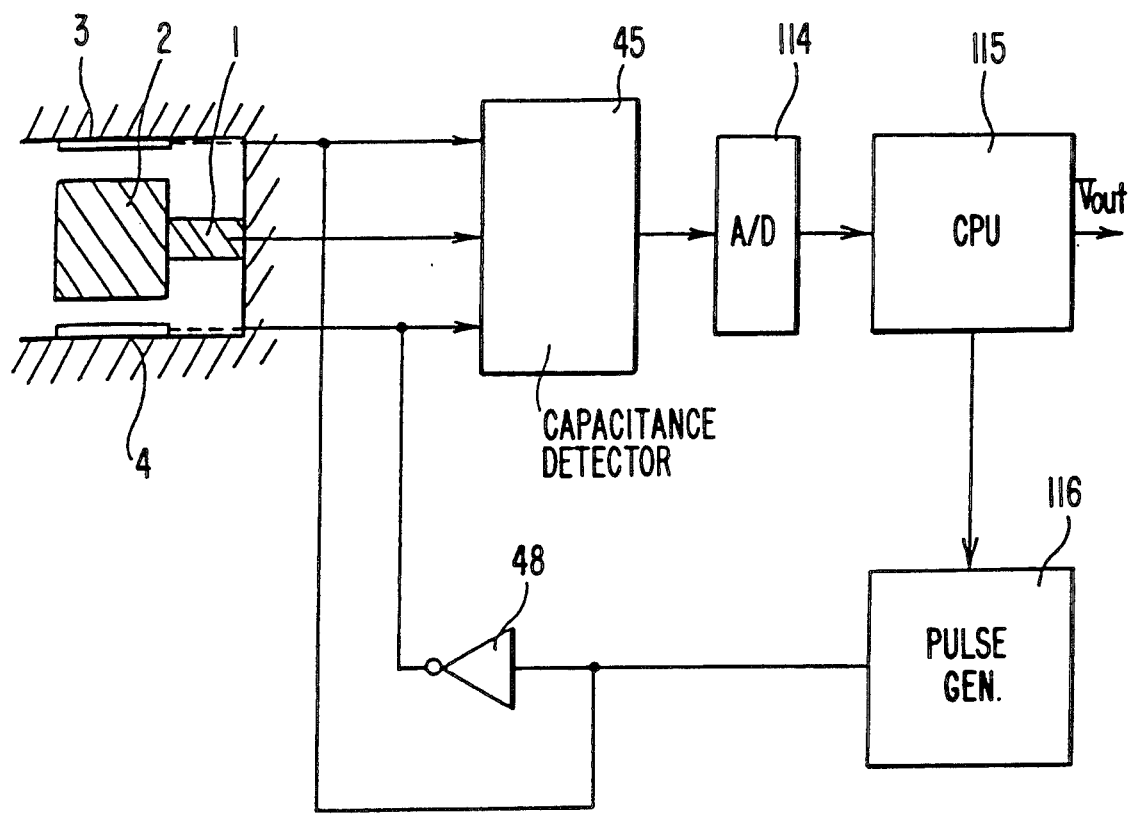
FIG. 24 is a structural view of an acceleration sensor of a further embodiment according to this invention.
Figure 25:
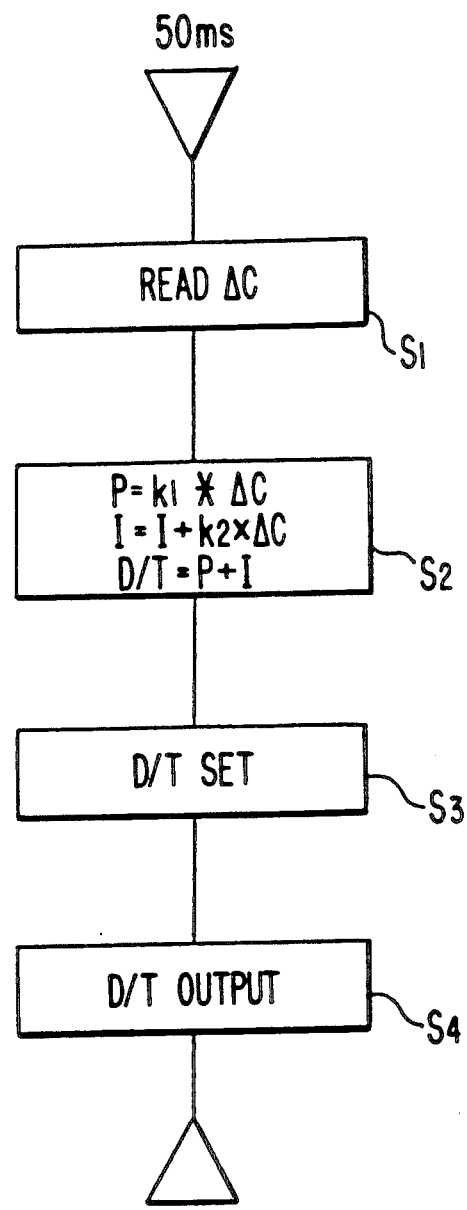
FIG. 25 is a control flow-chart of the operation of the acceleration sensor of the embodiment of FIG. 24.

FIG. 24 is a structural view of another embodiment of this invention.

A sensor portion of an acceleration sensor according to this embodiment consists of a silicon beam 1, a movable electrode 2, and fixed electrodes 3, 4 similar to the respective embodiments described before.

A signal processing system is comprised of a capacitance detector 45 to detect the difference $\Delta C$ of the static electric capacitance $C_1$, $C_2$ between the fixed electrodes 3, 4 and the movable electrode 2, an A/D converter 114 to digitize the output V of this capacitance detector 45, a pulse generator 116 to generate rectangular waves, an invertor 48 to invert the output of the pulse generator 116, and a control unit (CPU) 115 to control the A/D converter 114 and the pulse generator 116.

According to this embodiment, the static electric servo control of the movable electrode 2 and the acceleration detecting may be performed in a digital mode by utilizing the control unit 115 consisting of a microcomputer, and this operation is concretely performed as will be described on the basis of steps 51-54 in the flowchart of FIG. 23.

The output V of the difference value $\Delta C$ of the static electric capacitance detected by the capacitance detector 45 is converted to a digital signal by the A/D converter 114, and the control unit 115 inputs this digital signal to read $\Delta C$ (S1).

The control unit 115 determines a proportional element P which is $\Delta C$ multiplied by the constant $k_1$ and the integrating element I which is the total sum of $\Delta C$ multiplied by the constant $k_2$. And then, the sum of the proportional element P and the integrating element I is assigned as the duty ratio D/T, and this value is output to the pulse generator 116 as the control signal (S2~S4). Namely, the control unit 115 computes the duty ratio (pulse width modulation value) to control the positioning the movable electrode 2 to the neutral point on the basis of $\Delta C$, and the constants $k_1$, $k_2$ are used as the computing elements to determine this.

The pulse generator 116 performs the pulse width modulation of the output (rectangular wave voltage) according to this duty ratio, and this output voltage is applied to the fixed electrode 3, and the rectangular wave voltage inverted by the invertor 48 is applied to the fixed electrode 4. The movable electrode 2 is static electric servo controlled by these applied voltages similar to the respective embodiments described before. Further, according to this embodiment, the detecting of the acceleration is performed on the basis of the duty ratio D/T for the static electric servo control computed by CPU 15. Here, the duty ratio is the basic signal to static electric servo control the movable electrode 2, and this signal can be read as the signal which is proportional to acceleration similar to the signal taken out of the pulse width modulator 47 of the other embodiments. This series of steps is performed every 50 mS.

As described above, according to this invention, the acceleration can be detected with high precision by varying the ratio of time to be applied per unit period of voltage applied to the fixed electrodes (voltage of pulse train type) utilized for the static electric servo operation of the static electric capacitance type sensors, by inverting the voltage to one side of fixed electrode relative to the voltage to the other side of fixed electrode, without utilizing any linearizing compensation circuit, such as a root circuit, by operating the static electric servo mechanism substantially linerally, and also, by insuring the appropriate static electric servo operation.

Further, since the basic operation of the detecting portion is in a substantially linear mode, scattered output characteristics based on various factors during production can be easily adjusted, and the yield ratio of products during production can be improved.

Furthermore, since the fixed electrodes can used both for the static electric servo operation and for capacitance detection, reduction of size and cost of the products may be achieved by reducing number of components such as fixed electrodes and terminals. Also, the static electric servo operation can be always stably performed with a relatively low voltage.

Further, according to this invention, the fixed electrodes which are opposed to the movable electrode may be respectively disposed as electrode pairs with axes directions mutually opposed perpendicularly, so as to be able to detect acceleration in more than two dimensions.

Furthermore, the acceleration sensor of this invention may be applied to any field, and in the automobile field, for instance, it may be advantageously applied to a suspension adjusting system by detecting the flat or rough state of a road on the basis of an oscillating acceleration, a vehicle height control system, an anti-skid control system and the like.

Consequently, according to this invention, a capacitance type acceleration sensor can be provided which is of low cost and of good usability.

While the present invention has been described in terms of its preferred embodiments, it should be understood that numerous modifications may be made thereto without departing from the spirit and scope of the invention as defined in the appended claims. It is intended that all such modifications fall within the scope of the appended claims.

What is claimed is:

1. An accelerometer, comprising:
   a movable electrode which is moved in response to an acceleration;
   first and second fixed electrodes disposed in opposition to and spaced on opposite sides of the movable electrode;
   output means for generating an output voltage which is proportional to the acceleration by measuring a respective gap between the movable electrode and the first and second fixed electrodes;
   pulse width modulation means for generating pulses such that a pulse height of the pulses is constant and a pulse width of the pulses is modulated according to said output voltage;
   feedback means for generating an electrostatic force, which is proportional to the pulse width of the pulses generated by the pulse width modulation means, between the movable electrode and at least said first fixed electrode by feeding back said pulses to said first fixed electrode; and
   a bias circuit for adding a bias DC voltage between said movable electrode and only one of said first and second fixed electrodes.

2. An accelerometer as defined in claim 1, wherein said output means includes means for measuring a gap by detecting a capacitance between the movable electrode and the fixed electrode.

3. An accelerometer as defined in claim 1, wherein said output means includes means for measuring a gap optically using a photodetector.

4. An accelerometer as defined in claim 1, wherein said output means includes means for measuring a gap using a semiconductor strain gauge.

5. An accelerometer as defined in claim 1, wherein said output voltage represents a deviation between a signal representing a measure of a gap and a predetermined value.

6. An accelerometer, comprising:
a movable electrode which is moved in response to an acceleration;
first and second fixed electrodes disposed in opposition to and spaced on opposite sides of the movable electrode;
gap measuring means for measuring a respective gap between the movable electrode and the first and second fixed electrodes;
pulse width modulation means for generating pulses such that a pulse height of the pulses is constant and a pulse width of the pulses is modulated so that a deviation between a value representing a measure of at least one gap and a predetermined value is adjusted to be zero;
feedback means for generating an electrostatic force, which is proportional to the pulse width of the pulses generated by the pulse width modulation means, between the movable electrode and the first fixed electrode, by feeding back said pulses to said first fixed electrode;
output means for generating an output voltage which is proportional to the pulse width of said pulses as a measure of acceleration; and
a bias circuit for adding a bias DC voltage between said movable electrode and only one of said first and second fixed electrodes.

7. An accelerometer as defined in claim 6, wherein said output means includes means for measuring a gap by detecting a capacitance between the movable electrode and the fixed electrode.

8. An accelerometer as defined in claim 6, wherein said output means includes means for measuring a gap optically using a photodetector.

9. An accelerometer as defined in claim 6, wherein said output means includes means for measuring a gap using a semiconductor strain gauge.

10. An accelerometer, comprising:
a movable electrode which is moved in response to an acceleration;
a first fixed electrode facing to ne side of the movable electrode;
a second fixed electrode facing the other side of the movable electrode;
gap measuring means for measuring respective gaps between the movable electrode and the first and the second fixed electrodes;
output means for generating output voltages which are proportional to the respective gaps between the movable electrode and the first and the second fixed electrodes;
pulse width modulation means responsive to said output signals for generating pulses having a pulse height which is constant and a pulse width which is modulated in proportion to any deviation between the two gaps as indicated by said output signals;
feedback means for generating an electrostatic force, which is proportional to the pulse width of the pulses generated by the pulse width modulation means, between the movable electrode and the first and the second fixed electrode by feeding back said pulses to the first and second fixed electrodes so as to cause any deviation between the two gaps to be adjusted to zero; and
a bias circuit for applying a bias DC voltage to one of said first and second fixed electrodes, and wherein said feedback means applies said pulses to the other of said first and second fixed electrodes.

11. An accelerometer as defined in claim 10, wherein said gap measuring means operates to detect a capacitance between the movable electrode and one of the first and second fixed electrodes.

12. An accelerometer, comprising:
a movable electrode which is moved acceleration;
a first fixed electrode disposed on one side of and spaced from said movable electrode so as to form a first gap therewith;
a second fixed electrode disposed on the other side of and spaced from said movable electrode so as to form a second gap therewith;
gap measuring means for measuring the lengths of said first and second gaps, including means for generating an output signal representing any difference between the lengths of said first and second gaps;
pulse generating means responsive to said output signal for generating pulses having a pulse height which is constant and a pulse width which is modulated according to said output voltage;
inverting means for inverting said pulses generated by said pulse generating means to produce inverted pulses; and
feedback means for generating a first electrostatic force, which is proportional to the pulse width of the pulses generated by said pulse generating means, between the movable electrode and said first fixed electrode by applying said pulses to said first fixed electrode, and for generating a second electrostatic force, which is proportional to the pulse width of the inverted pulses provided by said inverting means, between the movable electrode and said second fixed electrode by applying said inverted pulses to said second fixed electrode.

13. An accelerometer as defined in claim 12, wherein said gap measuring means operates to detect a capacitance between the movable electrode and at least one of said first and second fixed electrodes.

14. An accelerometer as defined in claim 15, wherein said gap measuring means operates to detect the length of at least one of said first and second gaps optically using a photodetector.

15. An accelerometer as defined in claim 12, wherein said gap measuring means operates to detect the length of at least one of said first and second gaps using a semiconductor strain gauge.

16. An accelerometer as defined in claim 12, further including integrating means for integrating the pulse width of one of said pulses and inverted pulses to produce an acceleration signal representing a measure of said acceleration.

17. An accelerometer as defined in claim 12, further including means for providing said output signal as a measure of said acceleration.

18. An accelerometer as defined in claim 17, wherein said means for providing said output signal as a measure of said acceleration includes an analog/digital converter connected to receive said output signal and a central processing unit connected to receive an output of said analog/digital converter.

* * * * *